US011937107B2

(12) United States Patent
Farag et al.

(10) Patent No.: US 11,937,107 B2
(45) Date of Patent: Mar. 19, 2024

(54) METHOD AND APPARATUS FOR FAST BEAM MEASUREMENT AND REPORTING

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US); Dalin Zhu, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 17/447,807

(22) Filed: Sep. 15, 2021

(65) Prior Publication Data

US 2022/0104043 A1 Mar. 31, 2022

Related U.S. Application Data

(60) Provisional application No. 63/084,959, filed on Sep. 29, 2020, provisional application No. 63/086,983, (Continued)

(51) Int. Cl.
*H04W 24/08* (2009.01)
*H04L 5/00* (2006.01)
*H04W 24/10* (2009.01)

(52) U.S. Cl.
CPC ........... *H04W 24/08* (2013.01); *H04L 5/0048* (2013.01); *H04W 24/10* (2013.01)

(58) Field of Classification Search
CPC ...... H04W 24/08; H04W 24/10; H04L 5/0048
See application file for complete search history.

(56) References Cited

U.S. PATENT DOCUMENTS

2018/0343653 A1* 11/2018 Guo .................... H04W 72/542
2020/0204236 A1* 6/2020 Zhou ................... H04W 72/046
(Continued)

FOREIGN PATENT DOCUMENTS

EP 3547745 A1 10/2019
WO 2018232090 A1 12/2018
(Continued)

OTHER PUBLICATIONS

International Search Report and Written Opinion dated Jan. 14, 2022 regarding International Application No. PCT/KR2021/013365, 8 pages.
(Continued)

*Primary Examiner* — Zhiren Qin

(57) ABSTRACT

Methods and apparatuses for beam measurement and reporting. A method of operating a user equipment includes receiving information indicating associations between a set of transmission configuration (TCI) states and reference signals (RSs) for beam measurement, respectively, receiving a TCI state from the set of TCI states for beam indication, and determining, in response to reception of the TCI state, a RS for beam measurement based on the TCI state and the information. The method further includes transmitting or receiving the RS for beam measurement, and based on the RS being a downlink (DL) RS, measuring the DL RS and determining a measurement report; and transmitting the measurement report.

20 Claims, 17 Drawing Sheets

Related U.S. Application Data filed on Oct. 2, 2020, provisional application No. 63/151,340, filed on Feb. 19, 2021, provisional application No. 63/156,295, filed on Mar. 3, 2021.

(56) References Cited

U.S. PATENT DOCUMENTS

| | | | |
|---|---|---|---|
| 2020/0280416 A1 | 9/2020 | Gao et al. | |
| 2020/0288479 A1* | 9/2020 | Xi | H04W 76/27 |
| 2020/0383096 A1* | 12/2020 | Yang | H04L 5/0094 |
| 2021/0067233 A1* | 3/2021 | Guan | H04L 5/0048 |
| 2021/0111846 A1 | 4/2021 | Lee et al. | |
| 2021/0153238 A1* | 5/2021 | Zhou | H04L 5/0044 |
| 2021/0258964 A1* | 8/2021 | Khoshnevisan | H04B 7/0695 |
| 2021/0320699 A1* | 10/2021 | Zhou | H04W 72/23 |
| 2021/0321372 A1* | 10/2021 | Zhou | H04W 72/1268 |
| 2022/0007406 A1* | 1/2022 | Matsumura | H04L 5/0051 |
| 2022/0345923 A1* | 10/2022 | Gao | H04B 7/0417 |
| 2023/0179279 A1* | 6/2023 | Huang | H04L 5/0051 |
| | | | 370/252 |

FOREIGN PATENT DOCUMENTS

| | | |
|---|---|---|
| WO | 2019143900 A1 | 7/2019 |
| WO | 2019193581 A2 | 10/2019 |
| WO | 2019212224 A1 | 11/2019 |
| WO | 2020144637 A1 | 7/2020 |

OTHER PUBLICATIONS

Extended European Search Report dated Jul. 24, 2023 regarding Application No. 21876039.5, 13 pages.

Samsung, "On Beam Management, Measurement and Reporting", 3GPP TSG RAN WG1 Meeting 90bis, R1-1717605, Oct. 2017, 16 pages.

"3rd Generation Partnership Project; Technical Specification Group Radio Access Network; NR; Physical channels and modulation (Release 16)", 3GPP TS 38.211 V16.6.0, Jun. 2021, 134 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

* cited by examiner

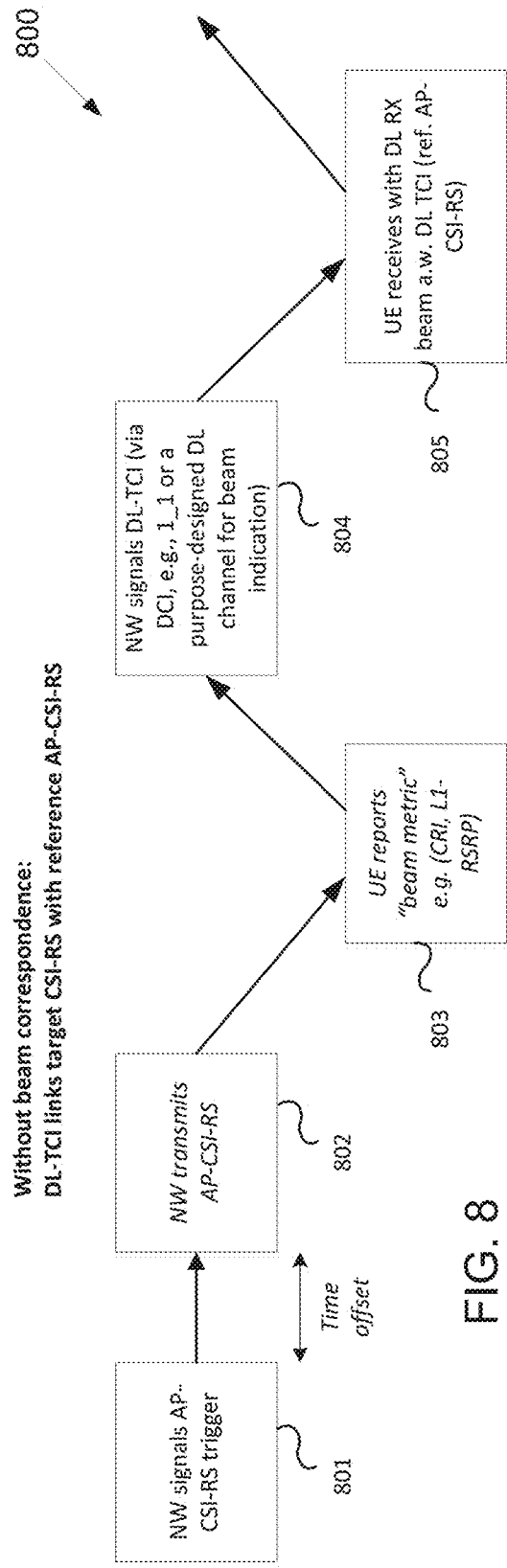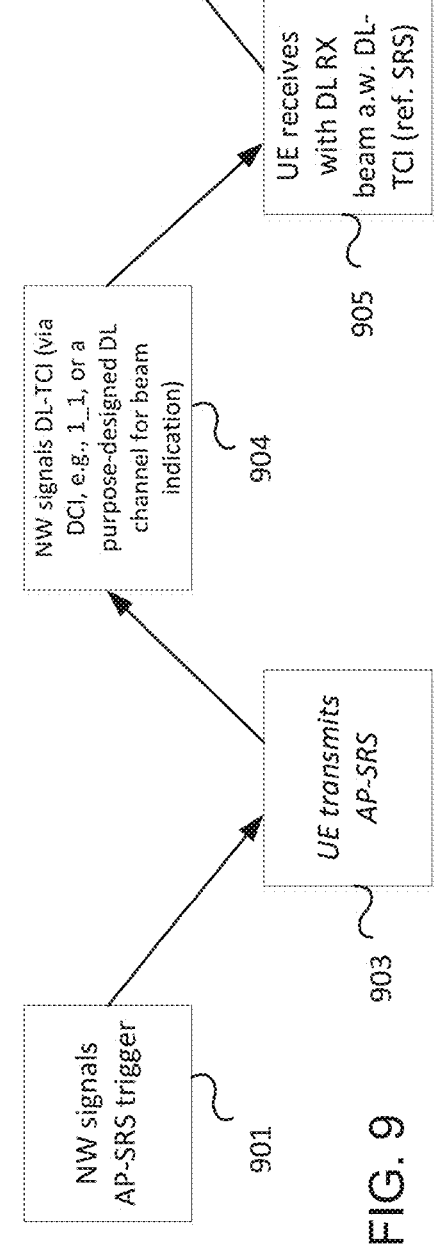
FIG. 8
FIG. 9

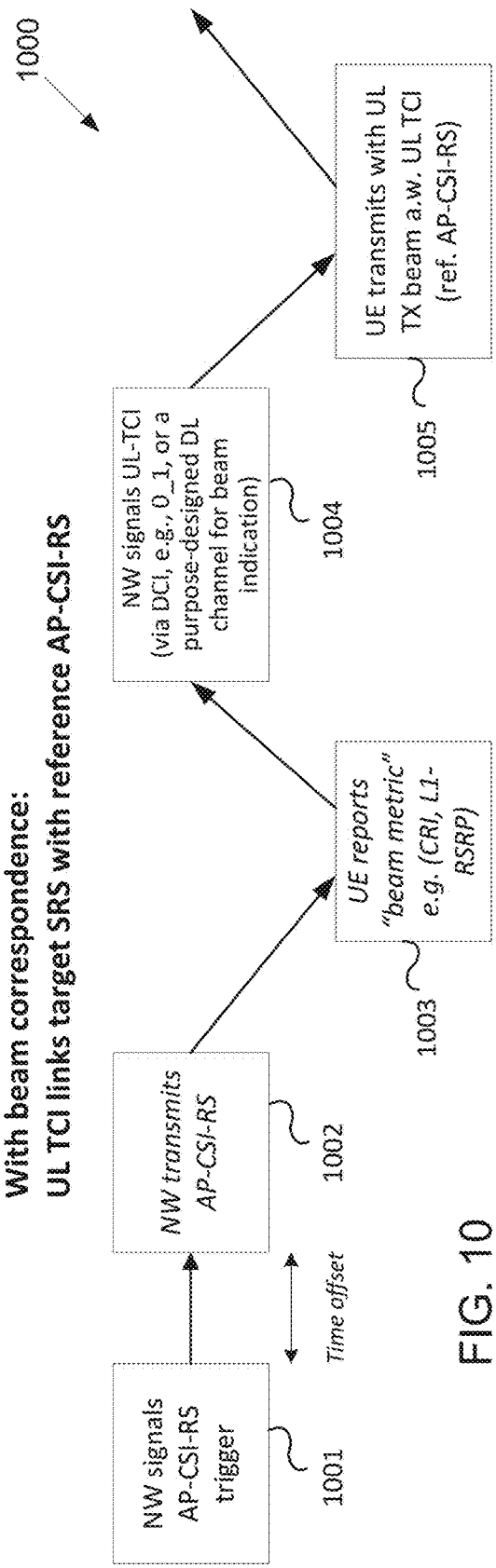
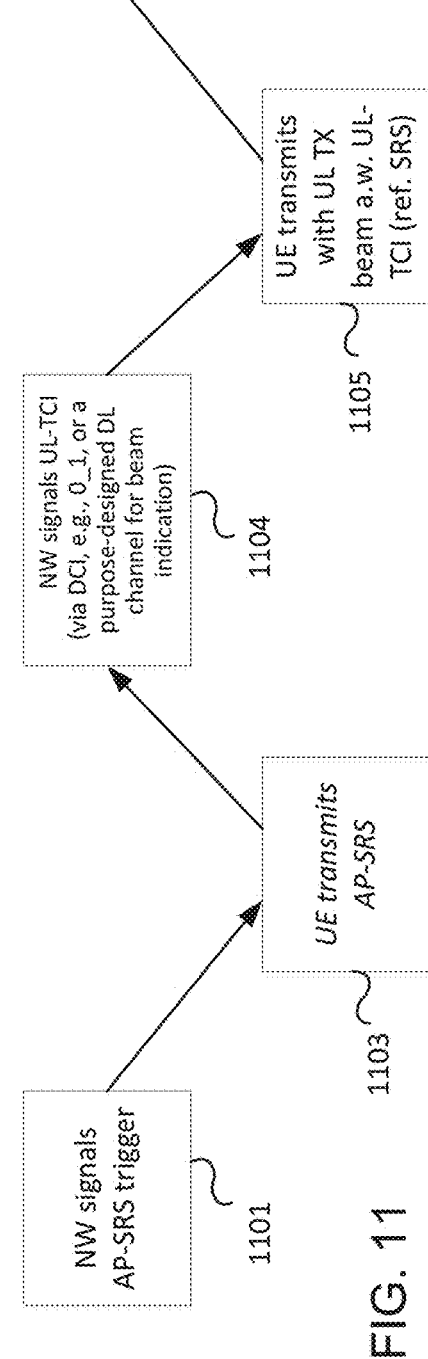
FIG. 10
FIG. 11

Each BMR can be in a separate reporting instance or all BMRs can be combined in the same reporting instance or partially combined in less than K reporting instances.

METHOD AND APPARATUS FOR FAST BEAM MEASUREMENT AND REPORTING

CROSS-REFERENCE TO RELATED APPLICATIONS AND CLAIM OF PRIORITY

The present application claims priority to:
U.S. Provisional Patent Application No. 63/084,959, filed on Sep. 29, 2020;
U.S. Provisional Patent Application No. 63/086,983, filed on Oct. 2, 2020;
U.S. Provisional Patent Application No. 63/151,340, filed on Feb. 19, 2021; and
U.S. Provisional Patent Application No. 63/156,295, filed on Mar. 3, 2021. The content of the above-identified patent document is incorporated herein by reference.

TECHNICAL FIELD

The present disclosure relates generally to wireless communication systems and, more specifically, the present disclosure relates to fast beam measurement and reporting.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a fast beam measurement and reporting.

In one embodiment, a user equipment (UE) is provided. The UE includes a transceiver configured to receive information indicating associations between a set of transmission configuration indication (TCI) states and reference signals (RSs) for beam management, respectively, and receive a TCI state from the set of TCI states for beam indication. The UE further includes a processor operably coupled to the transceiver. The processor is configured to determine, in response to reception of the TCI state, a RS based on the TCI state and the information. The transceiver is further configured to transmit or receive the RS for beam measurement. When the RS is a downlink (DL) RS, the processor is further configured to measure the RS and determine a measurement report, and the transceiver is further configured to transmit the measurement report.

In another embodiment, a base station (BS) is provided. The BS includes a transceiver configured to transmit information indicating associations between a set of TCI states and RSs for beam measurement, respectively, and transmit a TCI state from the set of TCI states for beam indication. The BS further includes a processor operably coupled to the transceiver. The processor is configured to determine a RS for beam measurement based on the TCI state and the information. The transceiver is further configured to receive or transmit the RS for beam measurement, and, when the RS is a DL RS, receive a measurement report indicating measurement of the RS.

In yet another embodiment, a method of operating a UE is provided. The method includes receiving information indicating associations between a set of TCI states and RSs for beam measurement, respectively, receiving a TCI state from the set of TCI states for beam indication, and determining, in response to reception of the TCI state, a RS for beam measurement based on the TCI state and the information. The method further includes transmitting or receiving the RS for beam measurement, and based on the RS being a DL RS, measuring the DL RS and determining a measurement report and transmitting the measurement report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a flowchart of a method for a DL multi-beam operation according to embodiments of the present disclosure;

FIG. 9 illustrates another flowchart of a method for a DL multi-beam operation according to embodiments of the present disclosure;

FIG. 10 illustrates a flowchart of a method for a UL multi-beam operation according to embodiments of the present disclosure;

FIG. 11 illustrates another flowchart of a method for a UL multi-beam operation according to embodiments of the present disclosure;

DETAILED DESCRIPTION

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.6.0, "NR; Physical channels and modulation"; 3GPP TS 38.212 v16.6.0, "NR; Multiplexing and Channel coding"; 3GPP TS 38.213 v16.6.0, "NR; Physical Layer Procedures for Control"; 3GPP TS 38.214 v16.6.0, "NR; Physical Layer Procedures for Data"; 3GPP TS 38.321 v16.5.0, "NR; Medium Access Control (MAC) protocol specification"; and 3GPP TS 38.331 v16.5.0, "NR; Radio Resource Control (RRC) Protocol Specification."

Figure 1:
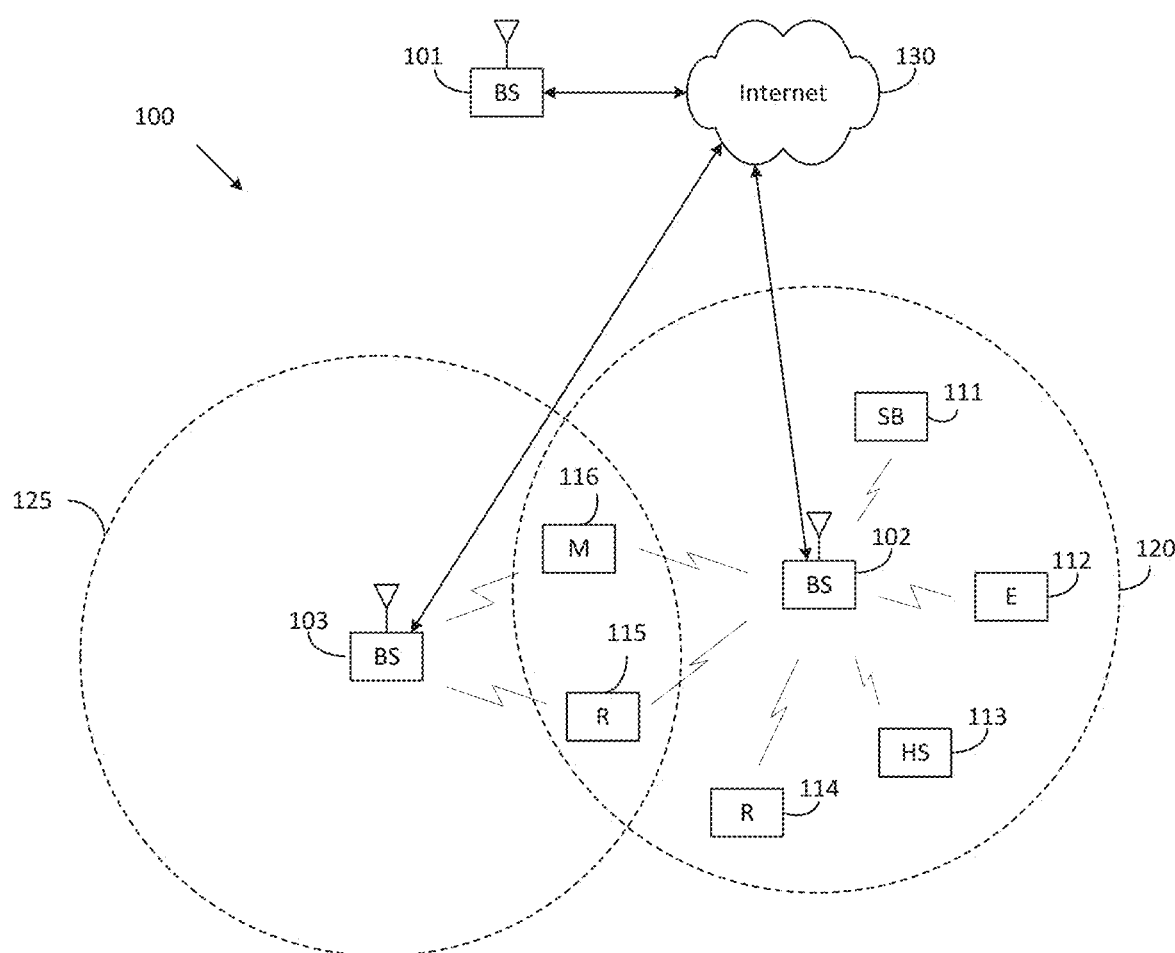
FIG. 1 illustrates an example wireless network according to embodiments of the present disclosure.
Figure 2:
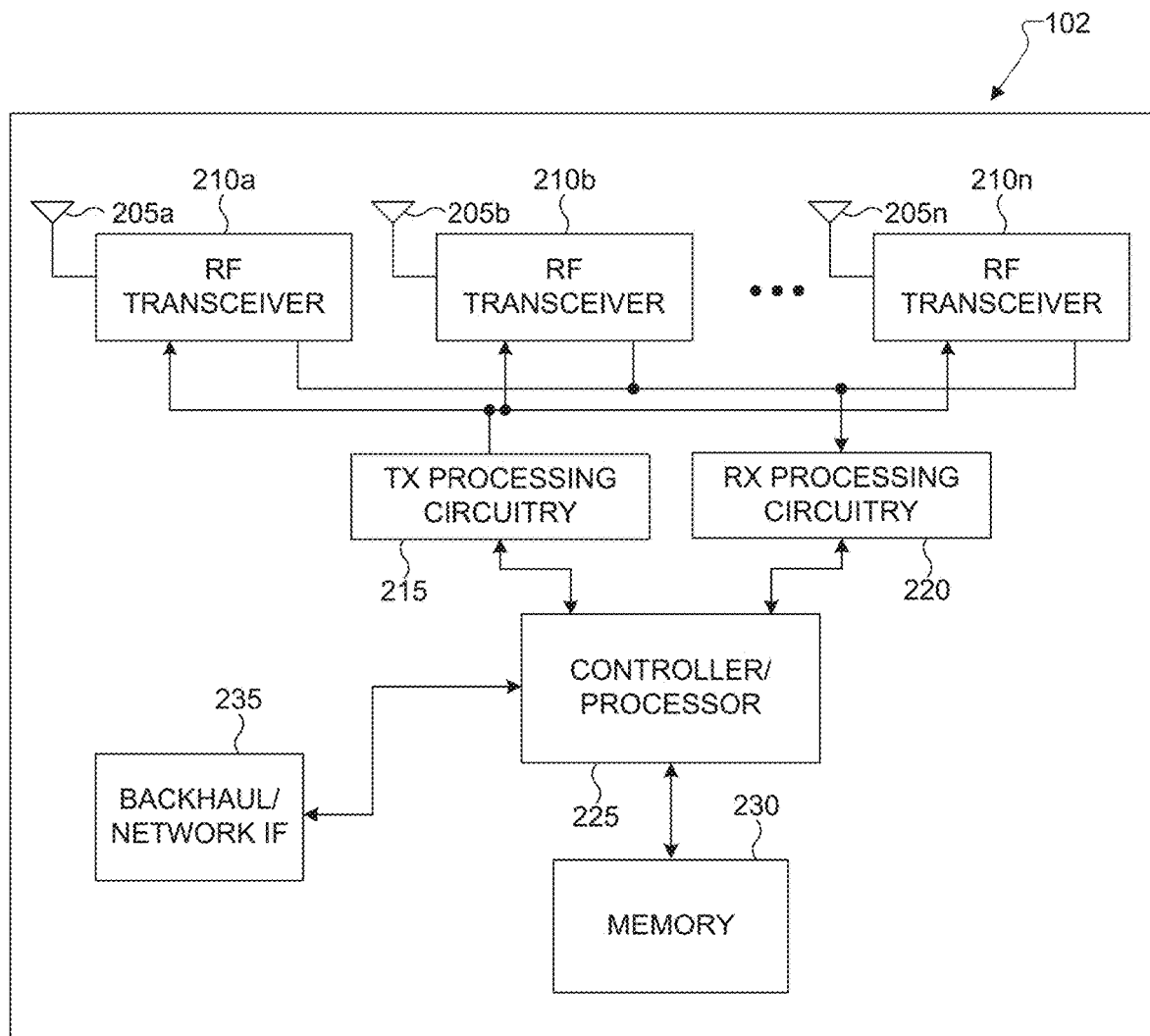
FIG. 2 illustrates an example gNB according to embodiments of the present disclosure.
Figure 3:
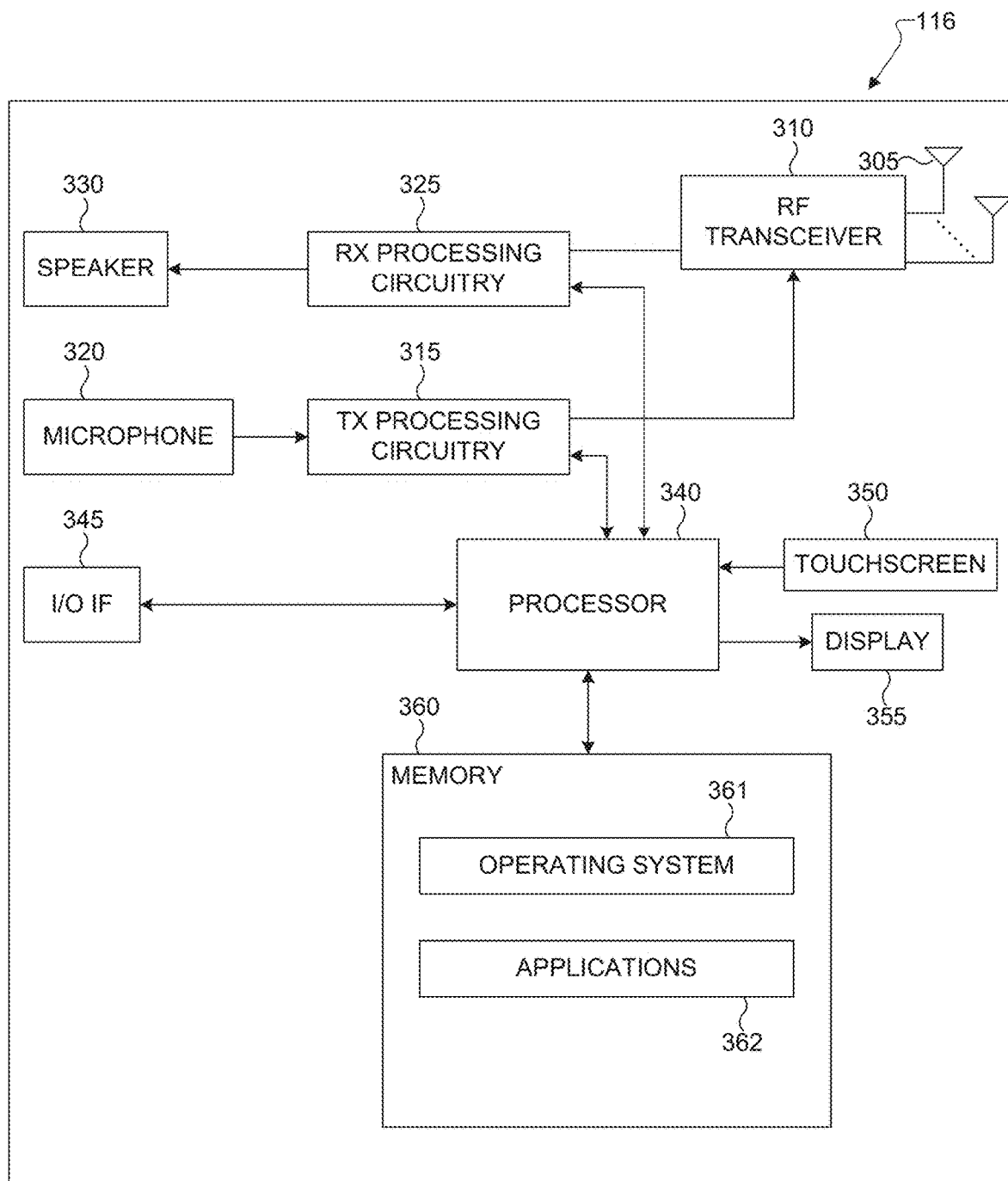
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a fast beam measurement and reporting. In certain embodiments, and one or more of the gNBs 101-103 includes circuitry, programing, or a combination thereof, for a fast beam measurement and reporting.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink channel signals and the transmission of uplink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a fast beam measurement and reporting. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
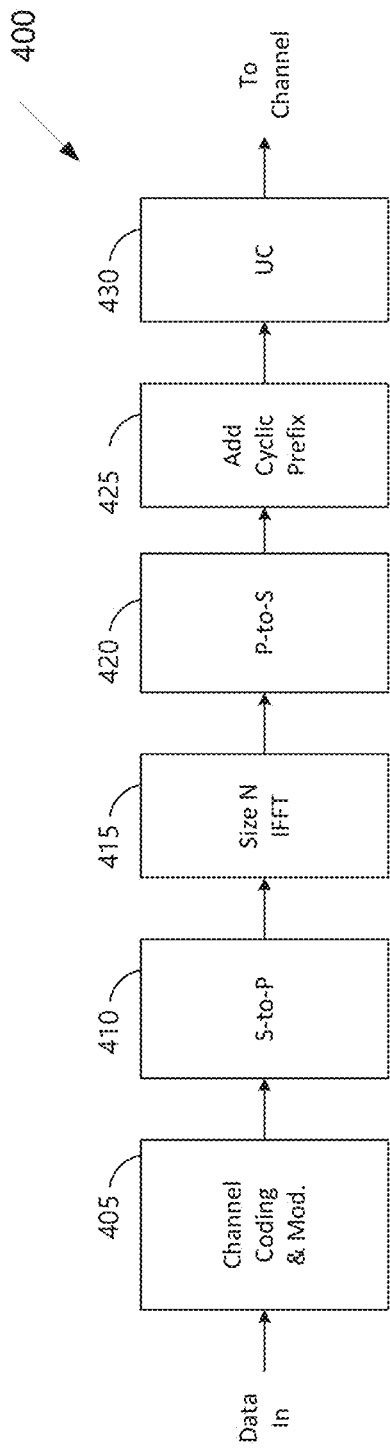
FIGS. 4 and 5 illustrate example wireless transmit and receive paths according to this disclosure.
Figure 5:
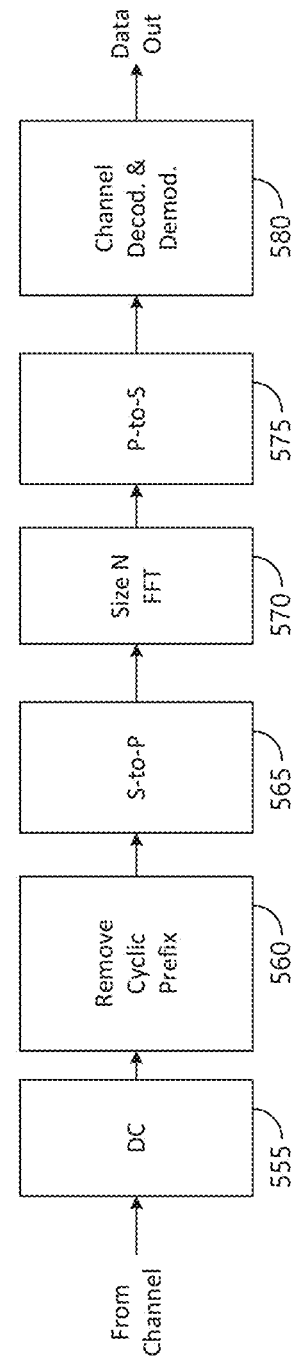

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
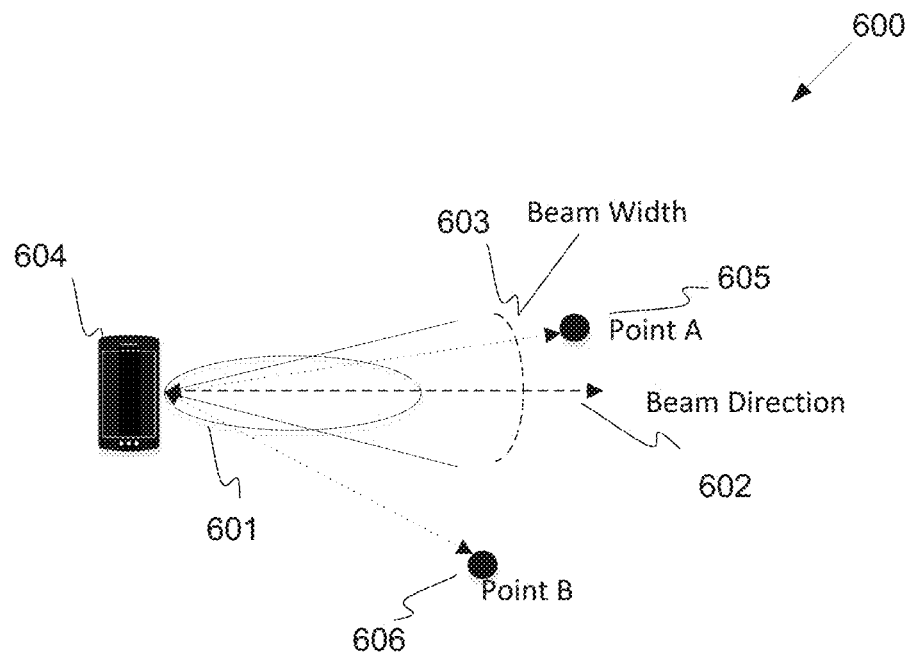
FIG. 6A illustrates an example of a beam in a wireless system according to embodiments of the present disclosure.

FIG. 6A illustrates an example of a beam in a wireless system 600 according to embodiments of the present disclosure. An embodiment of the beam shown in FIG. 6A is for illustration only.

As illustrated in FIG. 6A, in the wireless system 600, a beam 601, for a device 604, can be characterized by a beam direction 602 and a beam width 603. For example, a device 604 with a transmitter transmits RF energy in a beam direction and within a beam width. The device 604 with a receiver receives RF energy coming towards the device in a beam direction and within a beam width. As illustrated in FIG. 6A, a device at point A 605 can receive from and transmit to the device 604 as Point A is within a beam width of a beam traveling in a beam direction and coming from the device 604. A device at point B (606) cannot receive from and transmit to device (604) as Point B is outside a beam width and direction of a beam from device (604). While FIG. 6A, for illustrative purposes, shows a beam in 2-dimensions (2D), it should be apparent to those skilled in the art, that a beam can be in 3-dimensions (3D), where the beam direction and beam width are defined in space.

Figure 6B:
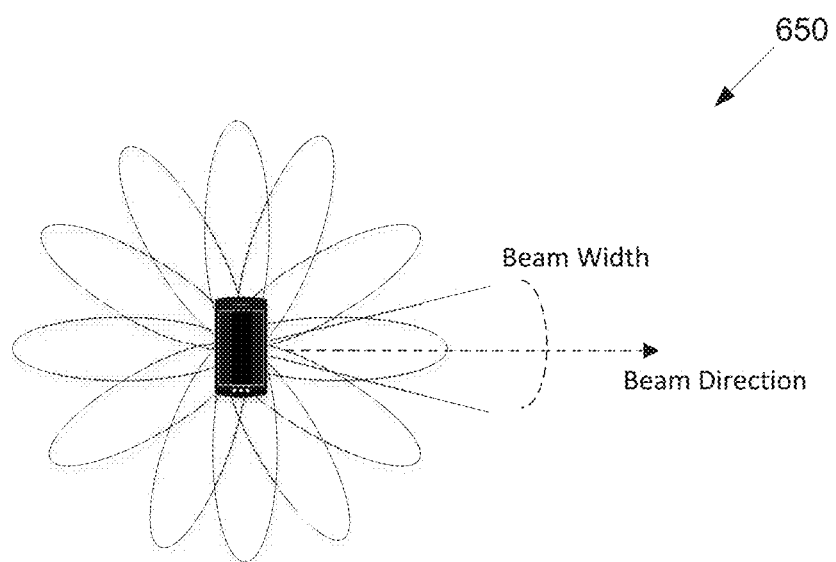
FIG. 6B illustrates an example multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
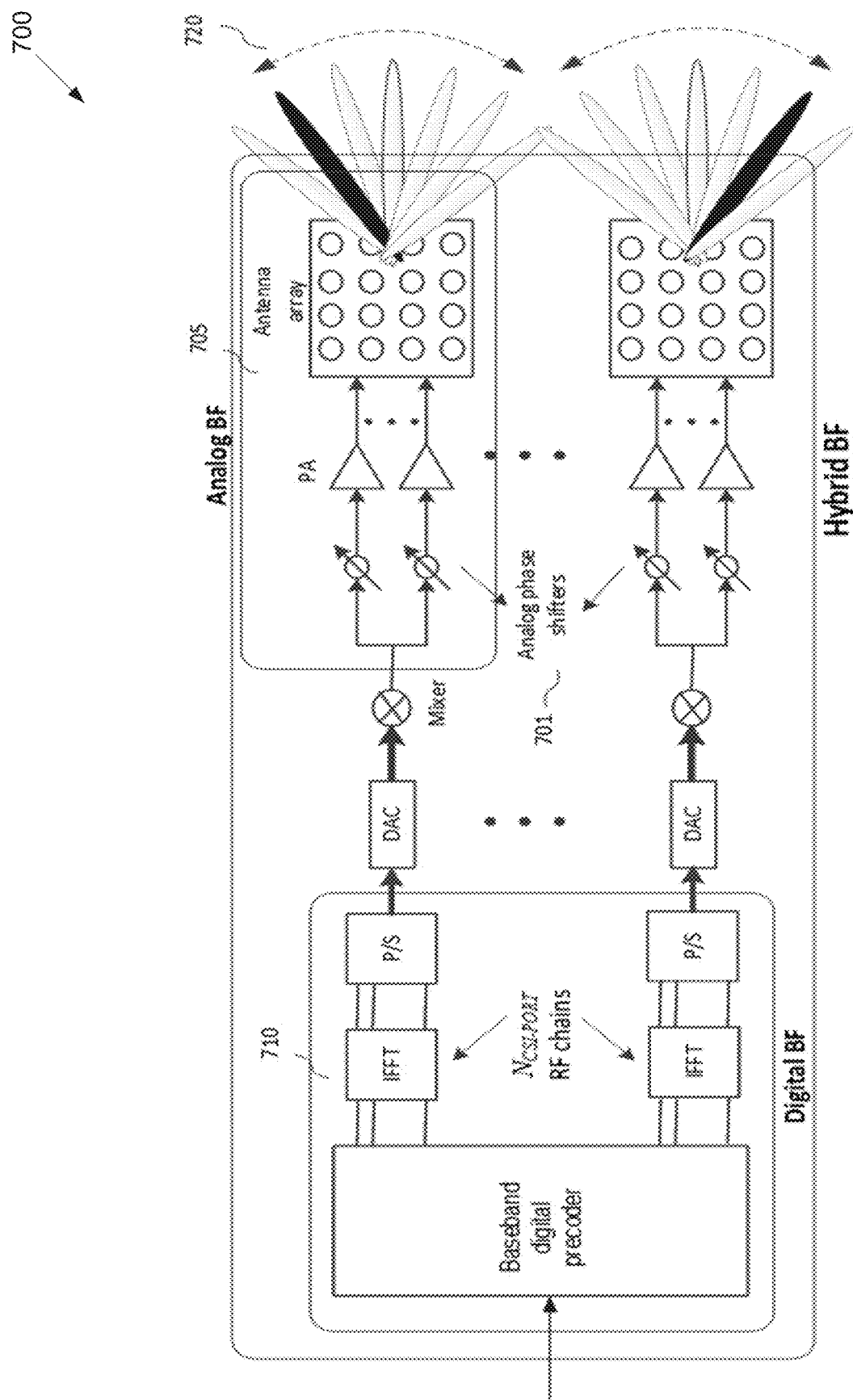
FIG. 7 illustrates an example antenna structure according to embodiments of the present disclosure.

FIG. 7 illustrates an example antenna structure 700 according to embodiments of the present disclosure. An embodiment of the antenna structure 700 shown in FIG. 7 is for illustration only. For example, the antenna structure 700 may be present in a wireless communication device, such as, for example, the UE 116 or the gNB 102 in FIG. 1.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI\text{-}PORT}$. A digital beamforming unit 710 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the described system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting," respectively), and receiving a DL or UL transmission via a selection of a corresponding receive (RX) beam.

The described system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

As also discussed in U.S. Patent Application Publication No. US 2021/0227530 (the '530 application), which is incorporated by reference herein, a TCI DCI can be a dedicated channel for beam indication information, i.e., a purposed designed DL channel for beam indication. Beam indication information can also be included in a DL-related DCI or in an UL-related DCI. In this disclosure more detailed aspects related to the configuration and signaling of beam indication relaying on L1 signaling as well as higher layer configuration and signaling are provided.

In release 15/16 a common framework is shared for CSI and beam management, while the complexity of such framework is justified for CSI in FR1, it makes beam management procedures rather cumbersome, and less efficient in FR2. Efficiency here refers to overhead associated with beam management operations and latency for reporting and indicating new beams.

Furthermore, in release 15 and release 16, the beam management framework is different for different channels. This increases the overhead of beam management and could lead to less robust beam-based operation. For example, for PDCCH the TCI state (used for beam indication), is updated through MAC CE signaling. While the TCI state of PDSCH can updated through a DL DCI carrying the DL assignment with codepoints configured by MAC CE, or the PDSCH TCI state can follow that of the corresponding PDCCH or use a default beam indication. In the uplink direction, the spatial-RelationInfo framework is used for beam indication for PUCCH and SRS, which is updated through RRC and MAC CE signaling. For PUSCH the SRI (SRS Resource Indicator), in an UL DCI with UL grants, can be used for beam indication. Having different beam indications and beam indication update mechanisms increases the complexity, overhead and latency of beam management, and could lead to less robust beam-based operation.

To reduce the latency and overhead of beam indication, L1 based beam indication has been provided, wherein a TCI DCI is used for beam indication. A TCI DCI can be a dedicated channel for beam indication information, i.e., a purposed designed DL channel for beam indication. Beam indication information can also be included in a DL-related DCI with our without a DL assignment or in an UL-related DCI with or without an UL grant. In this disclosure, design aspects are provided for fast beam measurement and reporting.

The present disclosure relates to a 5G/NR communication system and provides design aspects for fast beam measurement and reporting including RRC signaling, MAC CE and L1 control (DCI) signaling.

In the following, both FDD and TDD are considered as a duplex method for DL and UL signaling. Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated or is otherwise specified in the system operation or is configured by higher layers. Upon successfully decoding the signal, the UE responds according to an indication provided by the signal.

Terminology such as TCI, TCI states, TCI state IDs SpatialRelationInfo, source RS, target RS, reference RS, reference RS ID and other terms is used for illustrative purposes and is therefore not normative. Other terms that refer to same functions can also be used. In this disclosure TCI state and TCI state ID are used interchangeably, wherein a TCI state ID is a reference or identifier to a corresponding TCI state. In this disclosure reference signal (RS) and RS ID are used interchangeably, wherein a RS ID is a reference or identifier to a corresponding RS.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, that is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report, e.g., in 3GPP standard Specification Rel-15 NR, a beam report includes at least one layer 1-reference signal receive power (L1-RSRP) accompanied by at least one CSI-RS resource indicator (CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS or can be configured with a certain time-domain behavior, such as a periodicity and offset in case of periodic RS or can be a combination of such configuration and activation/deactivation in case of semi-persistent RS.

For mmWave bands (or FR2) or for higher frequency bands (such as >52.6 GHz or FR4) (or for FR2-1 for 24.25-52.6 GHz, and FR2-2 for 52.6-71 GHz (two ranges under the FR2 common range)) where multi-beam operation is especially relevant, a transmission-reception process includes a receiver selecting a receive (RX) beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam. In response, the UE measures the DL RS, and in the process selects a DL RX beam, and reports the beam metric associated with the quality of the DL RS. In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs.

Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RSs, either per reference RS or by "beam sweeping," and determine all TX-RX beam pairs associated with all the UL RSs configured to the UE to transmit.

The following two embodiments (A-1 and A-2) are examples of DL multi-beam operations that utilize DL-TCI-state based DL beam indication. In the first example embodiment (A-1), an aperiodic CSI-RS is transmitted by the NW/gNB and received/measured by the UE. This embodiment can be used regardless of whether or not there is UL-DL beam correspondence. In the second example embodiment (A-2), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

FIG. 8 illustrates a flowchart of a method 800 for a DL multi-beam operation according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In one example, as illustrated in FIG. 8 (embodiment A-1), a DL multi-beam operation (method 800) starts with the gNB/NW signaling to a UE an aperiodic CSI-RS (AP-CSI-RS) trigger or indication (step 801). In this disclosure, the trigger of the AP-CSI-RS can be performed through a beam indication (e.g., through TCI state indication). This trigger or indication can be included in a DCI and indicate transmission of AP-CSI-RS in a same (zero time offset) or in a later slot/sub-frame (>0 time offset). For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 802), the UE measures the AP-CSI-RS and calculates and reports a "beam metric" that indicates a quality of a particular TX beam hypothesis (step 803). Examples of such beam reporting are a CRI, or a SSB resource indicator (SSB-RI), coupled with an associated L1-RSRP/layer 1-reference signal receive quality (L1-RSRQ)/layer 1-signal to interference plus noise ratio (L1-SINR)/CQI.

Upon receiving the beam report from the UE, the gNB/NW can use the beam report to select a DL RX beam for the UE and indicate the DL RX beam selection (step 804) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 805).

Alternatively, the gNB/NW can use the beam report to select a DL RX beam for the UE and indicate to the UE the selected DL RX beam (step 804) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 805).

For this embodiment (A-1), as described above, the UE selects a DL RX beam using an index of a reference RS, such as an AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

FIG. 9 illustrates another flowchart of a method 900 for a DL multi-beam operation according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In another example, as illustrated in FIG. 9 (embodiment A-2), an DL multi-beam operation (method 900) starts with the gNB/NW signaling to a UE an aperiodic SRS (AP-SRS) trigger or request (step 901). In this disclosure, the trigger of the AP-SRS can be performed through a beam indication (e.g., through TCI state indication). This trigger can be included in a DCI format such as for example a DCI format scheduling a PDSCH reception or a PUSCH transmission. Upon receiving and decoding the DCI format with the AP-SRS trigger (step 902), the UE transmits an SRS (AP-SRS) to the gNB/NW (step 903) so that the NW (or gNB) can measure the UL propagation channel and select a DL RX beam for the UE for DL (at least when there is beam correspondence).

The gNB/NW can then indicate the DL RX beam selection (step 904) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 905).

Alternatively, the gNB/NW can indicate the DL RX beam selection (step 904) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 905).

For this embodiment (A-2), as described above, the UE selects the DL RX beam based on the UL TX beam associated with the reference RS (AP-SRS) index signaled via the TCI-state field.

Similarly, for a UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RSs, either per reference RS or by "beam sweeping," and determine all the TX-RX beam pairs associated with all the reference RSs configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In the first example embodiment (B-1), a NW transmits an aperiodic CSI-RS and a UE receives and measures the CSI-RS. This embodiment can be used, for instance, at least when there is reciprocity between the UL and DL beam-pair-link (BPL). This condition is termed "UL-DL beam correspondence."

In the second example embodiment (B-2), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

FIG. 10 illustrates a flowchart of a method 1000 for a UL multi-beam operation according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In one example, as illustrated in FIG. 10 (embodiment B-1), an UL multi-beam operation (method 1000) starts with the gNB/NW signaling to a UE an aperiodic CSI-RS (AP-CSI-RS) trigger or indication (step 1001). In this disclosure, the trigger of the AP-CSI-RS can be performed through a beam indication (e.g., through TCI state indication). This trigger or indication can be included in a DCI format, such as a DCI format scheduling a PDSCH reception to the UE or a PUSCH transmission from the UE and can be either separately or jointly signaled with an aperiodic CSI request/trigger and indicate transmission of AP-CSI-RS in a same slot (zero time offset) or in a later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CRI or SSB resource indicator (SSB-RI) together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1005).

Alternatively, the gNB/NW can use the beam report to select an UL TX beam for the UE and indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 105).

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

FIG. 11 illustrates another flowchart of a method 1100 for a UL multi-beam operation according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In another example, as illustrated in FIG. 11 (embodiment B-2), an UL multi-beam operation (method 1100) starts with the gNB/NW signaling to a UE an aperiodic SRS (AP-SRS) trigger or request (step 1101). In this disclosure, the trigger of the AP-SRS can be performed through a beam indication (e.g., through TCI state indication). This trigger can be included in a DCI format, such as a DCI format scheduling a PDSCH reception or a PUSCH transmission. Upon receiving and decoding the DCI format with the AP-SRS trigger (step 1102), the UE transmits AP-SRS to the gNB/NW (step 1103) so that the NW (or gNB) can measure the UL propagation channel and select an UL TX beam for the UE.

The gNB/NW can then indicate the UL TX beam selection (step 1104) using a value of the TCI-state field in the DCI format. In this case, the UL-TCI indicates a reference RS, such as an AP-SRS, representing the selected UL TX beam.

In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1105).

Alternatively, a gNB/NW can indicate the UL TX beam selection (step 1104) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1105).

For this embodiment (B-2), as described above, the UE selects the UL TX beam from the reference RS (in this case SRS) index signaled via the value of the TCI-state field.

In any of the following components, examples and sub-examples, flowcharts and diagrams maybe used for illustrative purposes. The present disclosure covers any possible variation of the flowcharts and diagrams as long as at least some of the components are included.

In the present disclosure, a TCI state is used for beam indication and can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

In one embodiment, DL beam measurement and reporting triggered by beam indication is provided.

As also discussed in the '530 application, a common beam indication can be signaled to the UE, wherein, the common beam indication can apply to DL channels (e.g., PDCCH and PDSCH) and/or to uplink channels (e.g., PUCCH and PUSCH). The common beam indication can be a TCI state, wherein a TCI state is associated with a reference signal (e.g., CSI-RS or SSB or SRS) with a QCL-TypeD establishing an association with a spatial filter. The common beam indication can be spatial relation information.

The network can indicate a new common TCI state (or spatial relation information) through DL control signaling (i.e., DCI) and/or through L2 signaling (e.g., MAC CE). In one example, the TCI state is associated with a reference signal (e.g., SSB or CSI-RS), wherein the reference signal is a source RS for the TCI state of QCL Type D or a spatial reference signal for the TCI state, associated with a coarse spatial filter.

In another example, the TCI state is associated with a reference signal (e.g., SRS), wherein the reference signal is a spatial reference signal for the TCI state, and the source RS of the reference signal is a DL reference signal (e.g., SSB or CSI-RS).

A TCI-state and/or a QCL-TypeD reference RS associated with the TCI-State and/or a source reference RS associated with the TCI state can be associated or mapped or linked to a set S, S is a set of reference signals for measurement of the channel, wherein, S can be a set of CSI-RS resource(s) and/or a set of CSI-RS resource set(s) and/or SSB resource (s) and/or SSB resource set(s) and/or SRS resource(s) and/or SRS resource set(s).

The new (most recently updated) TCI state indication triggers the aperiodic (AP)-CSI-RS and/or semi-persistent (SP)-CSI-RS and/or AP-SRS and/or SP-SRS for downlink beam measurement and beam reporting, wherein the CSI-RS resources or the CSI-RS resource sets associated with the AP-CSI-RS and/or SP-CSI-RS and/or AP-SRS and/or SP-SRS are those associated or mapped or linked to the new TCI state (i.e., set S). The measurement report includes one or more pairs of a resource indicator (e.g., CRI) and a corresponding beam metric measured on the resource indicator such as L1-RSRP/L1-RSRQ/L1-SINR/CQI.

In one embodiment, the UE assumes that the aforementioned RS (AP-CSI-RS and/or SP-CSI-RS and/or AP-SRS and/or SP-SRS) is (or, for SP, starts to be) transmitted concurrently with the beam indication after a timing offset T_OFFSET. Some example values of T_OFFSET include 0 (no offset) and n>0 OFDM symbol(s). The transmission of the RS can be assumed without an additional triggering from the NW (e.g., via the CSI request field in a channel conveying a beam indication (e.g., a TCI state) such as a purposed designed DCI format for beam indication, and/or UL-related DCI with or without UL grant and/or DL-related DCI with or without DL assignment). That is, the UE assumes that the RS is received T_OFFSET after the reception of the beam indication.

In one sub-embodiment, an RS trigger parameter is included in the beam indication together with the TCI state update. The RS trigger parameter can include some information on the RS such as a resource or resource set index/indices associated with the RS. In another sub-embodiment, a parameter indicating the T_OFFSET is included in the beam indication together with the TCI state update. The set of possible values of T_OFFSET can be configured via higher-layer (e.g., RRC) signaling and/or MAC CE signaling. The T_OFFSET signaled together with the TCI state update indicates a value taken from the set. In another sub-embodiment, both the RS trigger parameter and the T_OFFSET parameter are included in the beam indication together with the TCI state update. In another sub-embodiment, the beam indication does not include the RS trigger parameter or the T_OFFSET parameter. In this case, at least one of the RS resource or resource set indices or the T_OFFSET parameter is configured via higher-layer (e.g., RRC) signaling or MAC CE. Therefore, the TCI state update itself functions as the trigger for the RS with a pre-configured resource or resource set information and/or T_OFFSET value, if applicable. In one example T_OFFSET can depend on a UE capability. In one example, the configured/indicated T_OFFSET is greater than or greater than or equal to a minimum time offset determined based on the UE capability. In another example, T_OFFSET is provided by the UE capability.

In another embodiment, the UE assumes that the aforementioned RS (AP-CSI-RS and/or SP-CSI-RS and/or AP-SRS and/or SP-SRS) is (or, for SP, starts to be) transmitted after an additional (subsequent) triggering from the NW (e.g., via the CSI request field in UL-related and/or DL-related DCI) is received analogous to the regular procedure for the reception of aperiodic or semi-persistent RS. That is, after receiving the beam indication, the UE may await the reception of another CSI-RS/SRS triggering (e.g., via the CSI request field in UL-related DCI and/or DL-related DCI) before receiving the associated RS.

In one embodiment, the UE performs measurements for CSI and beam measurements on the aforementioned RS (AP-CSI-RS and/or SP-CSI-RS). The CSI/beam report can be explicitly or implicitly triggered by the TCI state indication without additional triggering from the network (e.g., via the CSI request field in a channel conveying a beam indication (e.g., a TCI state) such as a purposed designed DCI format for beam indication, and/or UL-related DCI with or with UL grant and/or DL-related DCI with or without DL assignment). That is the UE transmits the CSI/beam report T_OFFSET after the reception of the beam indication, alternatively, the UE transmits the CSI/beam report T_OFFSET after the reception of the corresponding RS. In one sub-embodiment, a CSI request trigger parameter is included in the beam indication together with the TCI state update. The CSI request trigger parameter can include some information on the CSI report such as a reporting resources and reporting metric type (e.g., L1-RSRP/L1-RSRQ/L1-SINR/channel quality indicator (CQI)).

In another sub-embodiment, a parameter indicating the T_OFFSET is included in the beam indication together with the TCI state update. The set of possible values of T_OFFSET can be configured via higher-layer (e.g., RRC) signaling and/or MAC CE signaling. The T_OFFSET signaled together with the TCI state update indicates a value taken from the set. In another sub-embodiment, both the CSI request trigger parameter and the T_OFFSET parameter are included in the beam indication together with the TCI state update. In another sub-embodiment, the beam indication does not include the CSI request trigger parameter or the T_OFFSET parameter. In this case, at least one of the CSI reporting resources or the T_OFFSET parameter is configured via higher-layer (e.g., RRC) signaling or MAC CE. Therefore, the TCI state update itself functions as the trigger for the CSI report with a pre-configured resource information and/or T_OFFSET value, if applicable. In one example T_OFFSET can depend on a UE capability. In one example, the configured/indicated T_OFFSET is greater than or greater than or equal to a minimum time offset determined based on the UE capability. In another example, T_OFFSET is provided by the UE capability.

In another embodiment, the UE assumes that CSI/beam report is transmitted after an additional (subsequent) triggering from the network (e.g., via the CSI request field in UL-related DCI and/or DL-related DCI) is received analogous to the regular procedure for the transmission of aperiodic or semi-persistent CSI/beam reports. That is, after receiving the beam indication, the UE may await the reception of another CSI/beam report trigger (e.g., via the CSI request field in UL-related and/or DL-related DCI) before transmitting the associated CSI/beam report.

In another embodiment, the UE performs measurements CSI and beam measurements on the aforementioned RS (AP-CSI-RS and/or SP-CSI-RS). The UE can decide (based on an event, either specified or not, such a change in the optimum beam or TCI state) whether a CSI/beam report is needed. If so, a UE-initiated report is transmitted.

In one example 1.1.1, a set S can be configured and/or updated through higher layer RRC signaling.

In another example 1.1.2, a set S can be configured and/or updated through MAC CE signaling.

In another example 1.1.3, a set S can be signaled to a UE dynamically through a CSI request providing set S without triggering CSI reporting.

In another example 1.1.4, a set S can be singled with the beam indication, i.e., the set S is signaled in the DCI of the beam indication and/or the MAC CE of the beam indication and/or a combination of MAC CE and DCI.

In another example 1.1.5, one or more set S can be configured and/or update through higher layer RRC signaling and/or MAC CE signaling. The mapping of one or more set S to one or more TCI states is configured and/or updated through RRC signaling. The TCI state in the channel conveying the beam indication implicitly determines the set S for beam measurement.

In one example 1.1a.1, the reporting resources (resources on which the beam report is transmitted including the type of channel (e.g., PUCCH or PUSCH)) and/or reporting metric type (L1-RSRP and/or L1-RSRQ and/or L1-SINR and/or CQI) can be configured and/or updated through higher layer RRC signaling.

In another example 1.1a.2, the reporting resources and/or reporting metric type can be configured and/or updated through MAC CE signaling.

In another example 1.1a.3, the reporting resources and/or reporting metric type can be signaled to a UE dynamically through a CSI request providing set S and the CSI reporting resources and/or reporting metric type.

In another example 1.1a.4, the reporting resources and/or reporting metric type can be signaled to a UE dynamically through a CSI report request trigger providing the CSI reporting resources and/or reporting metric type.

In another example 1.1a.5, the reporting resources and/or reporting metric type can be singled with the beam indication, i.e., the reporting resources and/or reporting metric type and/or set S are signaled in the DCI of the beam indication and/or the MAC CE of the beam indication and/or a combination of MAC CE and DCI.

In one example 1.1a.6, the UL resources for conveying the beam report are configured on PUCCH.

In another example 1.1a.7, the UL resources for conveying the beam report are configured on PUSCH and include a first part beam report and a second part report or just one beam report part.

Figure 12A:
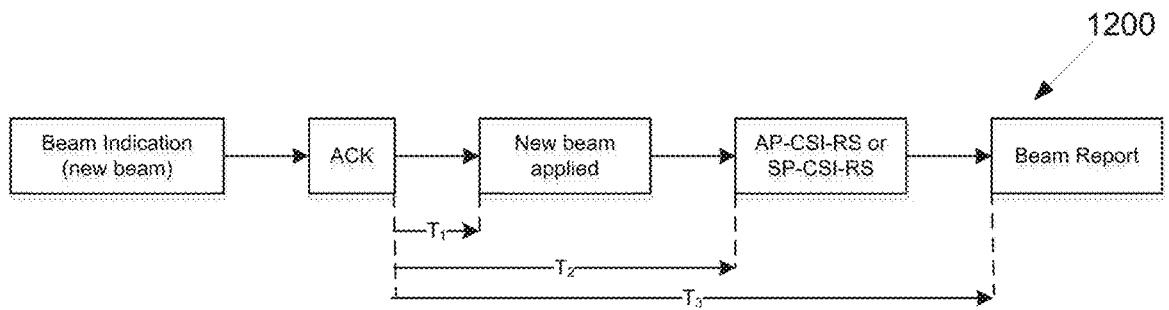
FIG. 12A illustrates an example new beam indication and beam/channel measurement and reporting according to embodiments of the present disclosure.
Figure 12B:
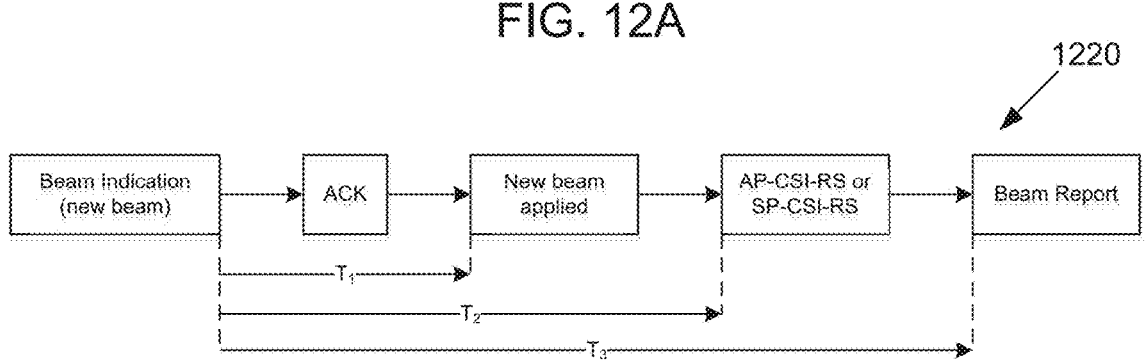
FIG. 12B illustrates another example new beam indication and beam/channel measurement and reporting according to embodiments of the present disclosure.
Figure 12C:
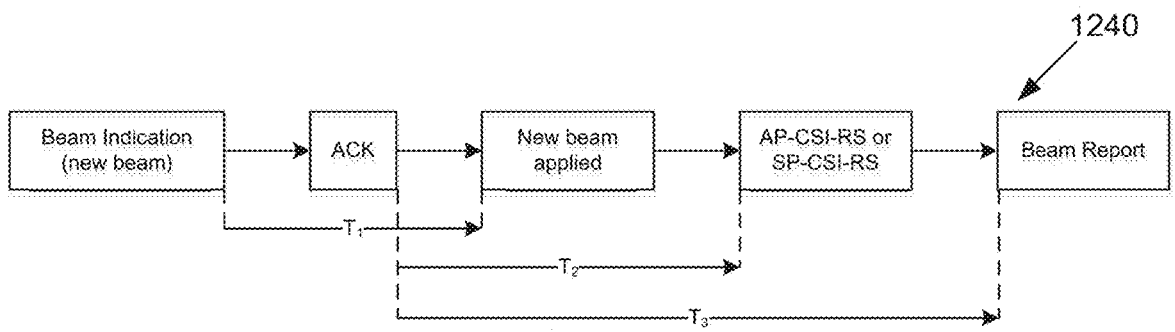
FIG. 12C illustrates yet another example new beam indication and beam/channel measurement and reporting according to embodiments of the present disclosure.
Figure 12D:
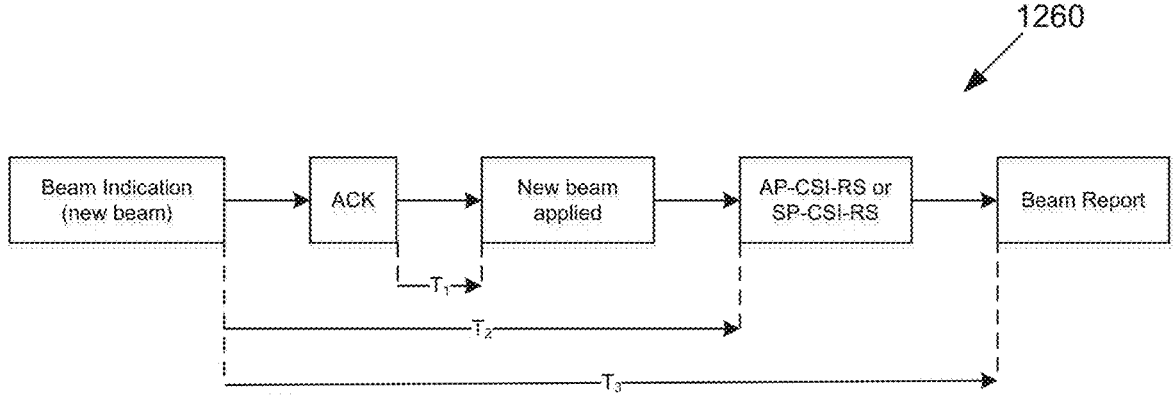
FIG. 12D illustrates yet another example new beam indication and beam/channel measurement and reporting according to embodiments of the present disclosure.

FIG. 12A illustrates an example new beam indication and beam/channel measurement and reporting 1200 according to embodiments of the present disclosure. An embodiment of the new beam indication and beam/channel measurement and reporting 1200 shown in FIG. 12A is for illustration only. FIG. 12B illustrates another example new beam indication and beam/channel measurement and reporting 1220 according to embodiments of the present disclosure. An embodiment of the new beam indication and beam/channel measurement and reporting 1220 shown in FIG. 12B is for illustration only. FIG. 12C illustrates yet another example new beam indication and beam/channel measurement and reporting 1240 according to embodiments of the present disclosure. An embodiment of the new beam indication and beam/channel measurement and reporting 1240 shown in FIG. 12C is for illustration only. FIG. 12D illustrates yet another example new beam indication and beam/channel measurement and reporting 1260 according to embodiments of the present disclosure. An embodiment of the new beam indication and beam/channel measurement and reporting 1260 shown in FIG. 12D is for illustration only.

Figure 13:
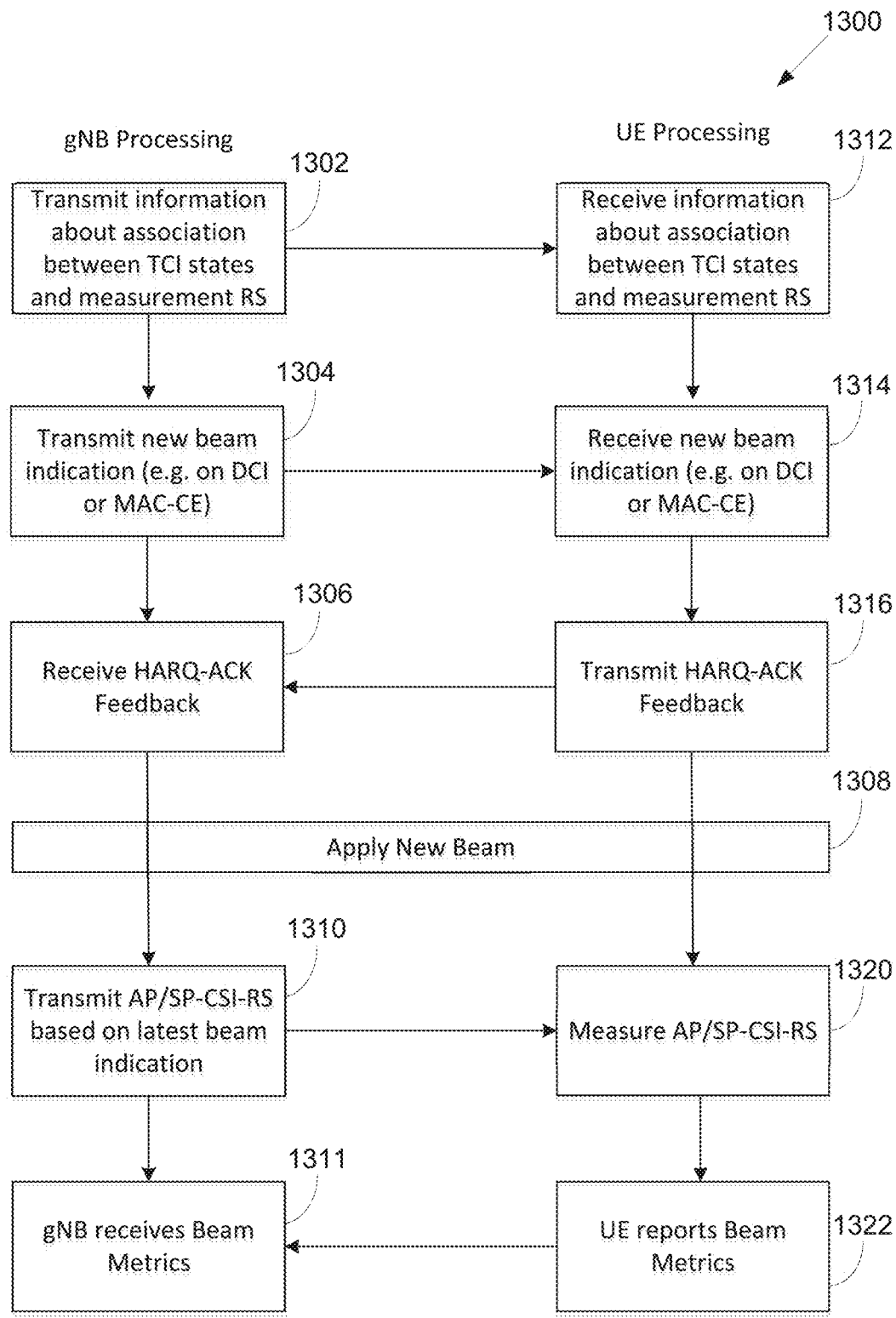
FIG. 13 illustrates an example gNB and UE operation for new beam indication and beam/channel measurement and reporting according to embodiments of the present disclosure.

FIG. 13 illustrates an example gNB and UE operation 1300 for new beam indication and beam/channel measurement and reporting according to embodiments of the present disclosure. For example, the gNB and UE operation 1300 as may be performed by a UE such 111-116 and a BS (e.g., gNB) such as 101-103 as illustrated in FIG. 1. An embodiment of the gNB and UE operation 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, a gNB and a UE performs an operation for a new beam indication and beam/channel measurement and reporting. In 1302, the gNB transmits information about association between TCI states and measurement RS to the UE. In 1312, the UE receives the information about association between TCI states and measurement RS. In 1304, the gNB transmits a new beam indication to the UE. In 1314, the UE receives the new beam indication, for example, using DCI or MAC-CE. The DCI can be a purpose-designed DCI conveying beam indication, a DL related DCI with or without DL assignment conveying beam indication and/or an UL related DCI with or without UL grant conveying beam indication. MAC CE can be a MAC CE conveying beam indication. Beam indication can include one or more TCI states, and/or one or more TCI state code points, wherein a TCI state code point can indicate one or more TCI states. In 1316, the UE transmits HARQ-ACK feedback to the gNB for beam indication. In 1306, the gNB receives the HARQ-ACK feedback for beam indication. In 1308, the gNB and the UE apply the new beam or beams, e.g., based on the indicated TCI state(s), for further operation between the gNB and the UE. In 1310, the gNB transmits AP/SP-CSI-RS(s) based on latest beam indication to the UE. In 1320, the UE measures the AP/SP-CSI-RS(s). In 1322, the UE reports beam metrics to the gNB based on the measured RS(s). In 1311, the gNB receives the beam metrics.

As illustrated in FIGS. 12A, 12B, 12C, 12D, and FIG. 13, a new beam indication (e.g., a new TCI state or a new spatial relation information) is indicated to a UE, for example through L1 control signaling (i.e., DCI) and/or through L2 signaling (i.e., MAC CE). The UE receives the corresponding beam indication and in response provides HARQ-ACK feedback to the gNB. The gNB and UE can apply the new beam (i.e., TCI state or spatial relation filter) after time $T_1$ after the start or the end of the channel conveying the HARQ-ACK feedback with positive acknowledgement for beam indication. In another example, the gNB and UE can apply the new beam (i.e., TCI state or spatial relation filter) after time $T_1$ after the start or the end of the channel conveying the beam indication that is positively acknowledged. An AP-CSI-RS or SP-CSI-RS is triggered after time $T_2$ after the start or the end of the channel conveying the HARQ-ACK feedback with positive acknowledgement for beam indication (e.g., FIG. 12A and FIG. 12C).

In another example, an AP-CSI-RS or SP-CSI-RS is triggered after time $T_2$ after the start or the end of the channel conveying the beam indication that is positively acknowledged (e.g., as illustrated in FIG. 12B and FIG. 12D). In another example, an AP-CSI-RS or SP-CSI-RS is triggered after time $T_2$ after the start or the end of the channel conveying the beam indication. The AP-CSI-RS or SP-CSI-RS includes CSI-RS resources and/or resource sets in set S. In one example 1.2.1, $T_2$ is configured and/or updated by higher layer RRC signaling. In another example 1.2.2, $T_2$ is configured and/or updated by MAC CE signaling. In another example 1.2.3, $T_2$ is indicated by the beam indication signaling (DCI or MAC CE), wherein the code points for $T_2$ can be configured and/or updated by RRC signaling or by MAC CE signaling. $T_2$ can be larger than or equal to or smaller than $T_1$. The UE reports beam metrics and corresponding resource indicators based on set S. In one example $T_2$ can depend on a UE capability. In one example, the configured/indicated $T_2$ is greater than or greater than or equal to a minimum time offset determined based on the UE capability. In another example, $T_2$ is provided by the UE capability. In one example, $T_2$ is not provided and the beam measurement RS is received by the UE at the same time the new indicated by the TCI state triggering the beam measurement RS is applied, i.e., based on time $T_1$. In one example, $T_2$ depends on the sub-carrier spacing. In one sub-example, the sub-carrier spacing can be the subcarrier spacing of the channel conveying the beam indication, the channel conveying the acknowledgment of the beam indication, or the beam measurement RS. In another sub-example, the sub-carrier spacing can be the minimum subcarrier spacing of two or more of the aforementioned channels or RSs. In one example, $T_2$ is specified in the system specifications, e.g., $T_2$ can be specified in the system specifications based on subcarrier spacing and/or UE capability. In one example $T_2$ is configured/indicated by the network with a minimum value specified in the system specifications, e.g., the minimum value can be specified in the system specifications based on subcarrier spacing and/or UE capability.

In another example, a measurement report is triggered after time $T_3$ after the start or the end of the channel conveying the beam indication that is positively acknowledged (e.g., as illustrated in FIG. 12B and FIG. 12D). In another example, a measurement report is triggered after time $T_3$ after the start or the end of the channel conveying the beam indication. In another example a measurement report is triggered after time $T_3$ after the start or the end of the channel conveying the HARQ-ACK feedback with positive acknowledgement for beam indication (e.g., as illustrated in FIG. 12A and FIG. 12C). In another example, a measurement report is triggered after time $T_3$ after the start or the end of the corresponding CSI-RS resources. The measurement includes beam measurements (e.g., L1-RSRP and/or L1-RSRQ and/or L1-SINR and CQI) of some or all of the CSI-RS resources and/or resource sets in set S. In one example 1.2.4, $T_3$ is configured and/or updated by higher layer RRC signaling. In another example 1.2.5, $T_3$ is configured and/or updated by MAC CE signaling. In another example 1.2.6, $T_3$ is indicated by the beam indication signaling (DCI or MAC CE), wherein the code points for $T_3$ can be configured and/or updated by RRC signaling or by MAC CE signaling. In one example $T_3$ can depend on a UE capability. In one example, the configured/indicated $T_3$ is greater than or greater than or equal to a minimum time offset determined based on the UE capability. In another example, $T_3$ is provided by the UE capability. In one example, $T_3$ depends on the sub-carrier spacing. In one sub-example, the sub-carrier spacing can be the subcarrier spacing of the channel conveying the beam indication, the channel conveying the acknowledgment of the beam indication, the beam measurement RS, or the channel conveying the measurement report. In another sub-example, the sub-carrier spacing can be the minimum subcarrier spacing of two or more of the aforementioned channels or RSs. In one example, $T_3$ is specified in the system specifications, e.g., $T_3$ can be specified in the system specifications based on subcarrier spacing and/or UE capability. In one example $T_3$ is configured/indicated by the network with a minimum value specified in the system specifications, e.g., the minimum value can be specified in the system specifications based on subcarrier spacing and/or UE capability.

In FIG. 13, network provides the UE information about association between the TCI states to be indicated to the UE and measurement RS (step 1302), e.g., as indicated in Table 1, wherein the measurement RS can be aperiodic CSI-RS or semi-persistent CSI-RS.

TABLE 1

Association between TCI States and Reference Signals
(Reference Signal IDs) used for beam measurement.

| TCI State | Measurement RS (e.g., aperiodic CSI-RS or semi-persistent CSI-RS) |
|---|---|
| TCI_State_0 | RS_0_0, RS_0_1, . . . |
| TCI_State_1 | RS_1_0, . . . |
| . . . | . . . |

In one example 1.3.1, the CSI-RS resource can be configured with "repetition off," i.e., a UE may not assume that the CSI-RS resources within a CSI-RS resource set are transmitted with a same downlink spatial domain transmission filter.

In another example 1.3.2, the CSI-RS resource can be configured with "repetition on," i.e., a UE can assume that the CSI-RS resources within a CSI-RS resource set are transmitted with a same downlink spatial domain transmission filter.

In another example 1.3.3, as also discussed in U.S. patent application Ser. No. 17/302,582, filed May 6 2021 (the '582 application), which is incorporated by reference herein, the CSI-RS resource can be configured with "repetition partially on," i.e., a UE can assume that a subset of the CSI-RS resources within a CSI-RS resource set are transmitted with a same downlink spatial domain transmission filter, the UE may not assume that the CSI-RS resources within different subsets of the CSI-RS resource set are transmitted with a same downlink spatial domain transmission filter.

In one example 1.4, the channel conveying the beam indication includes $M_D \geq 1$ DL TCI state IDs, and/or $N_U \geq 1$ UL TCI state IDs and/or $M_j = N_j \geq 1$ joint DL/UL state IDs.

In one example 1.4.1, $M_D + N_U + M_j = 1$, i.e., the channel conveying the beam indications includes one TCI state ID: (1) $M_D = 1$, $N_U = 0$ and $M_j = 0$; (2) $M_D = 0$, $N_U = 1$ and $M_j = 0$; or $M_D = 0$, $N_U = 0$ and $M_j = 1$. Set S corresponds to the indicated DL TCI state ID or UL TCI state ID or joint TCI state ID. The UE reports beam metrics and corresponding resource indicators based on set S.

In one example 1.4.2, $M_D + N_U + M_j \geq 1$, $K = M_D + N_U + M_j$ TCI state IDs are included in the channel conveying the beam indications. This is illustrated in FIG. 14.

Figure 14:
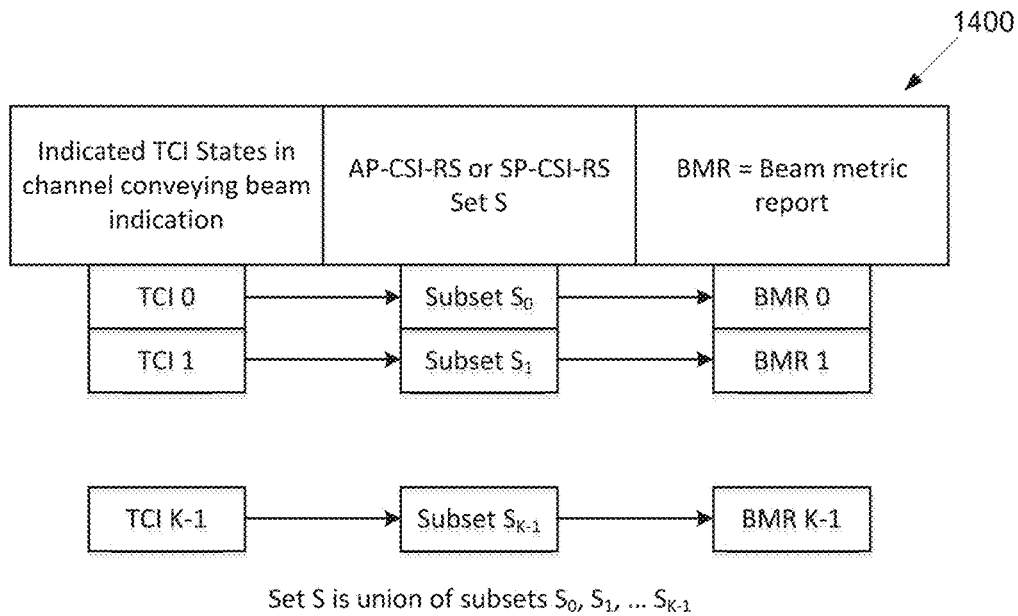
FIG. 14 illustrates an example beam indication and beam/channel measurement and reporting according to embodiments of the present disclosure.

FIG. 14 illustrates an example beam indication and beam/channel measurement and reporting 1400 according to embodiments of the present disclosure. An embodiment of the beam indication and beam/channel measurement and reporting 1400 shown in FIG. 14 is for illustration only.

Set S includes K subsets of AP-CSI-RS or SP-CSI-RS resources, each subset corresponds to an indicated TCI state ID. The association between a TCI state ID and the AP-CSI-RS or SP-CSI-RS resources in the subset can be configured/updated by RRC signaling and/or MAC CE signaling. The UE reports K beam metric reports, wherein each beam metric report includes beam metrics and corresponding resource indicators based on a corresponding subset of S. The association between a beam metric report and a subset of S (and/or a TCI state ID) can be configured/updated by RRC signaling and/or MAC CE signaling.

In one example, the K beam metric reports are included in a same reporting instance.

In another example, each beam metric report is included in its own reporting instance, there are K reporting instances for the K beam metric reports.

In another example, the K beam metric reports are included in more than one reporting instance but less than K reporting instances, a reporting instance can include one or more beam metric reports.

In one example 1.4.3, $M_D + N_U + M_j \geq 1$, $K = M_D + N_U + M_j$ TCI state IDs are included in the channel conveying the beam indications.

Set S includes K1 subsets of AP-CSI-RS or SP-CSI-RS resources, wherein K1≤K. Each indicated TCI state ID corresponds to at most one subset in set S. The association between a TCI state ID and the AP-CSI-RS or SP-CSI-RS resources in the subset can be configured/updated by RRC signaling and/or MAC CE signaling. The UE reports K1 beam metric reports, wherein each beam metric report includes beam metrics and corresponding resource indicators based on a corresponding subset of S. The association between a beam metric report and a subset of S (and/or a TCI state ID) can be configured/updated by RRC signaling and/or MAC CE signaling.

In one example, the K1 beam metric reports are included in a same reporting instance.

In another example, each beam metric report is included in its own reporting instance, there are K1 reporting instances for the K1 beam metric reports.

In another example, the K1 beam metric reports are included in more than one reporting instance but less than K1 reporting instances, a reporting instance can include one or more beam metric reports.

In one example, an indicated TCI state ID has no corresponding subset in set S, and no corresponding beam metric report.

In another example, a subset in set S can correspond to one or more indicated TCI state IDs.

In another example, the channel conveying the TCI state IDs can indicate the TCI state IDs for which a UE reports a beam metric report.

In one example 1.5, a network can configure through high layer signaling (RRC signaling and/or MAC CE signaling): (1) a first set or sets of DL measurement RS resources (e.g., CSI-RS and/or SSB), and beam measurement reporting resources and beam measurement types; and/or (2) a second set or sets of UL measurement RS resources (e.g., SRS).

A channel conveying a beam indication can indicate whether the UE: (1) measures the DL measurement RS resources and provides the beam measurement report on the configured resources for beam reporting; (2) transmits an UL measurement RS (e.g., SRS); or do both (1) and (2).

The indication type of measurement RS(s) can be based on a new flag in the channel conveying the beam indication, new values for an existing flag in the channel conveying the beam indication, a combination of field values of exiting fields in the channel conveying the beam indication or a specific RNTI or a specific RNTI in the channel conveying the beam indication.

The measurement RS resources and the report resources (if applicable), can be one of the following: (1) explicitly signaled in the channel conveying a beam indication (e.g., a TCI state); or (2) implicitly determined based higher layer configuration of resource sets and mapping of resource sets to TCI states, and the TCI state indicated in the channel conveying a beam indication.

In examples as aforementioned above, the channel conveying the beam indication can trigger a beam measurement report. The measurement RS resources can be implicitly determined without further indication.

In one embodiment, DL beam measurement and reporting updated by beam indication is provided.

As also discussed in the '530 application, a common beam indication can be signaled to the UE, wherein, the common beam indication can apply to DL channels (e.g., PDCCH and PDSCH) and/or to uplink channels (e.g., PUCCH and PUSCH). The common beam indication can be a TCI state, wherein a TCI state is associated with a reference signal (e.g., CSI-RS or SSB or SRS) with a QCL-TypeD establishing an association with a spatial filter. The common beam indication can be spatial relation information.

The network can indicate a new common TCI state (or spatial relation information) through DL control signaling (i.e., DCI) and/or through L2 signaling (e.g., MAC CE). In one example, the UE is configured with reference signals R for beam measurement and reporting. In one example 2.1.1, R can correspond to a SSB resources. In another example 2.1.2, R can correspond to CSI-RS resources or resource sets, wherein in one example 2.1.2.1 the CSI-RS resources are periodic CSI-RS resources, in another example 2.1.2.2, the CSI-RS resources are semi-persistent CSI-RS resources. In another example 2.1.3, R can contain SSB and/or CSI-RS according to more than one of examples 2.1.1, 2.1.2.1 and 2.1.2.2.

A TCI-state and/or a QCL-TypeD reference RS associated with the TCI-State can be mapped or linked to a set S, wherein, S is a set of SSB resource(s) and SSB resource set(s) and/or a set of CSI-RS resource(s) and/or a set of CSI-RS resource set(s), and set S is a subset of R. A new TCI state indication updates the periodic or semi-persistent resources (i.e., SSBs or CSI-RS) for downlink beam measurement and beam reporting, wherein the resources for beam measurement are those of set S linked or mapped to the new TCI state.

In one example 2.2.1, set S can be configured and/or updated through higher layer RRC signaling. The mapping of one or more set S to one or more TCI states is configured and/or updated through RRC signaling.

The TCI state in the channel conveying the beam indication implicitly determines the set S for beam measurement.

In another example 2.2.2, set S can be configured and/or updated through MAC CE signaling. The mapping of one or more set S to one or more TCI states is configured and/or updated through MAC CE signaling.

The TCI state in the channel conveying the beam indication implicitly determines the set S for beam measurement.

In another example 2.2.3, set S can be signaled to a UE dynamically through a CSI request providing set S without triggering CSI reporting.

In another example 2.2.4, set S can be singled with the beam indication, i.e., set S is signaled in the DCI of the beam indication and/or the MAC CE of the beam indication and/or a combination of MAC CE and DCI.

In one example 2.2.4.1, RRC signaling and/or MAC CE signaling configures one or more set S, the DCI of the beam indication (i.e., the channel conveying the beam indication) conveys a set index for beam measurement.

In one example 2.2a.1, the reporting resources and/or reporting metric type (L1-RSRP and/or L1-RSRQ and/or L1-SINR and/or CQI) can be configured and/or updated through higher layer RRC signaling.

In another example 2.2a.2, the reporting resources (resources on which the beam report is transmitted including the type of channel (e.g., PUCCH or PUSCH)) and/or reporting metric type can be configured and/or updated through MAC CE signaling.

In another example 2.2a.3, the reporting resources and/or reporting metric type can be signaled to a UE dynamically through a CSI request providing set S and the CSI reporting resources and/or reporting metric type.

In another example 2.2a.4, the reporting resources and/or reporting metric type can be signaled to a UE dynamically through a CSI report request trigger providing the CSI reporting resources and/or reporting resource type.

In another example 2.2a.5, the reporting resources and/or reporting metric type can be singled with the beam indication, i.e., the reporting resources and/or reporting metric type and/or set S are signaled in the DCI of the beam indication and/or the MAC CE of the beam indication and/or a combination of MAC CE and DCI.

In one example 2.2a.6, the UL resources for conveying the beam report are configured on PUCCH.

In another example 2.2a.7, the UL resources for conveying the beam report are configured on PUSCH and include a first part beam report and a second part report or just one beam report part.

Figure 15:
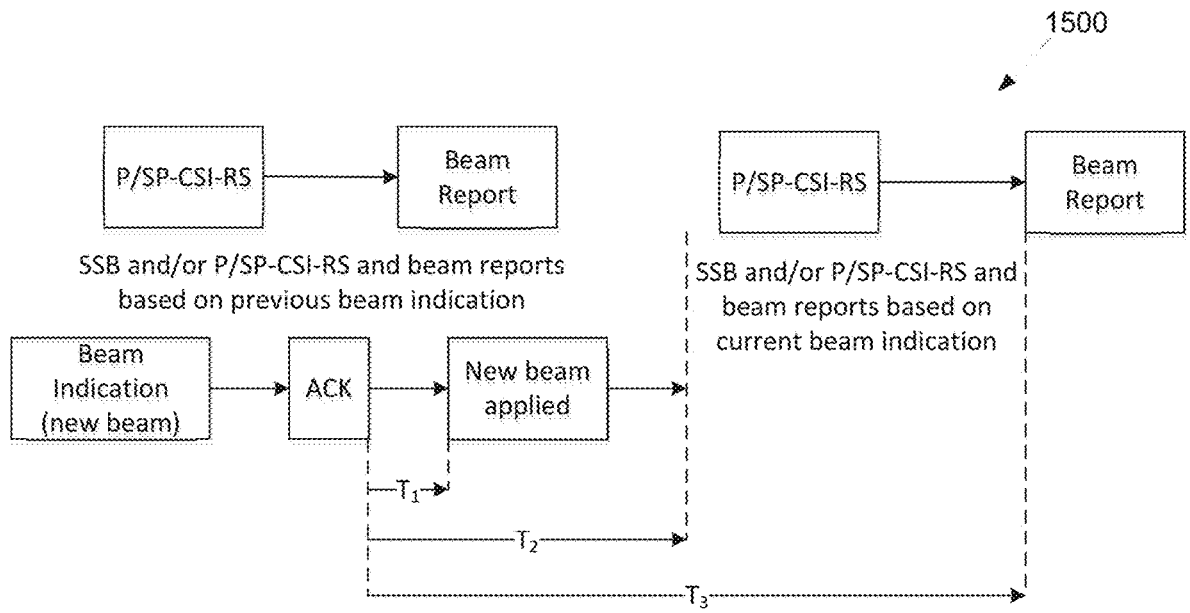
FIG. 15 illustrates an example new beam indication and beam/channel measurement and reporting according to embodiments of the present disclosure.

FIG. 15 illustrates an example new beam indication and beam/channel measurement and reporting 1500 according to embodiments of the present disclosure. An embodiment of the new beam indication and beam/channel measurement and reporting 1500 shown in FIG. 15 is for illustration only.

Figure 16:
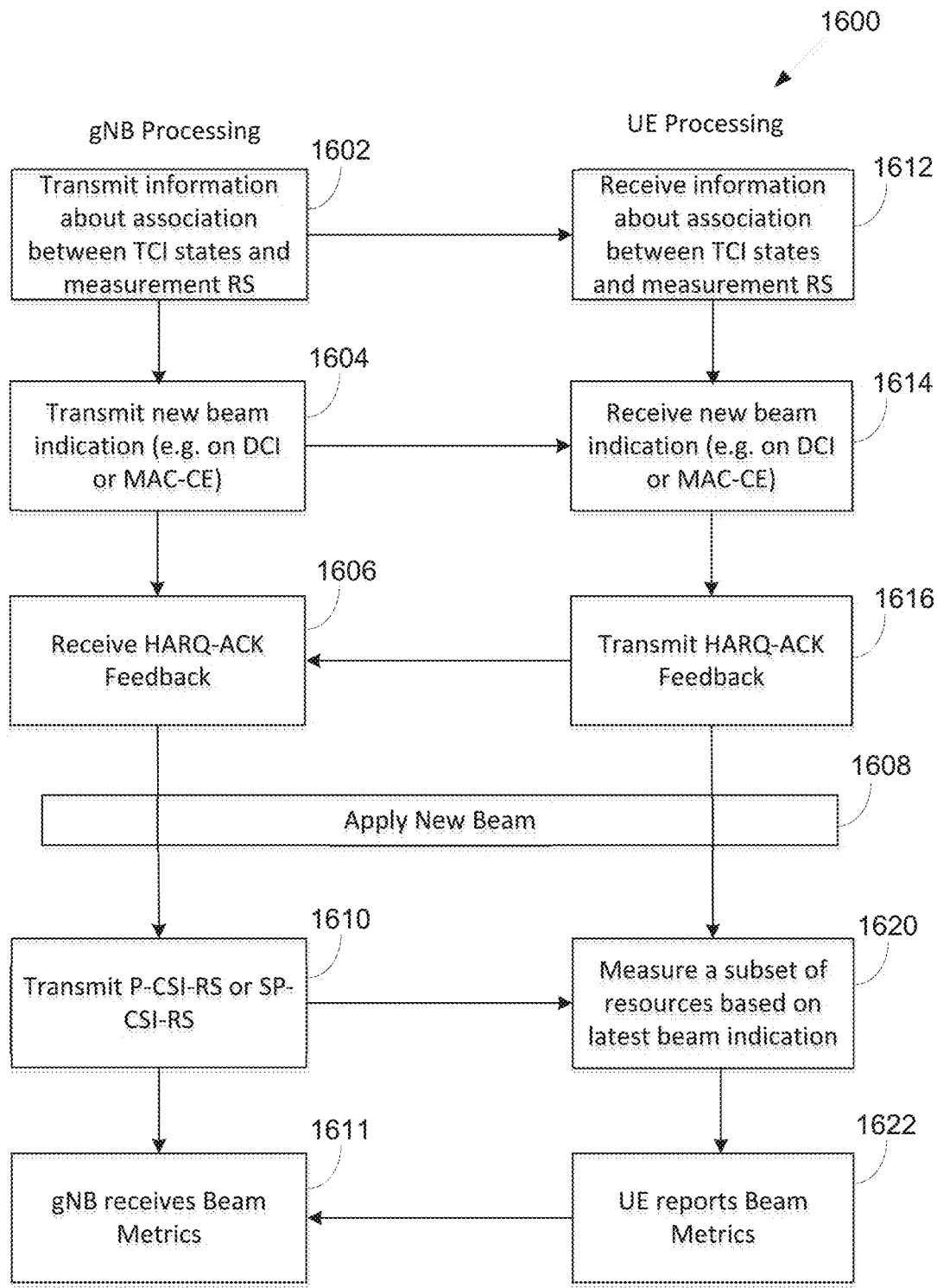
FIG. 16 illustrates an example gNB and UE operation for new beam indication and beam/channel measurement and reporting according to embodiments of the present disclosure.

FIG. 16 illustrates an example gNB and UE operation 1600 according to embodiments of the present disclosure. For example, the gNB and UE operation 1600 as may be performed by a UE such 111-116 and a BS (e.g., gNB) such as 101-103 as illustrated in FIG. 1. An embodiment of the gNB and UE operation 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

As illustrated in FIG. 16, a gNB and a UE performs an operation for a new beam indication and beam/channel measurement and reporting. In 1602, the gNB transmits information about association between TCI states and measurement RS to the UE. In 1612, the UE receives the information about association between TCI states and measurement RS. In 1604, the gNB transmits a new beam indication to the UE. In 1614, the UE receives the new beam indication, for example, using DCI or MAC-CE. The DCI can be a purpose-designed DCI conveying beam indication, a DL related DCI with or without DL assignment conveying beam indication and/or an UL related DCI with or without UL grant conveying beam indication. MAC CE can be a MAC CE conveying beam indication. Beam indication can include one or more TCI states, and/or one or more TCI state code points, wherein a TCI state code point can indicate one or more TCI states. In 1616, the UE transmits HARQ-ACK feedback to the gNB for beam indication. In 1606, the gNB receives the HARQ-ACK feedback for beam indication. In 1608, the gNB and the UE apply the new beam or beams, e.g., based on the indicated TCI state(s), for further operation between the gNB and the UE. In 1610, the gNB transmits P-CSI-RS or SP-CSI-RS to the UE. In one example, the gNB is transmitting the P-CSI-RS and/or SP-CSI-RS and/or SSB with a same corresponding spatial filter before and after beam indication, the UE measures a subset of P-CSI-RS and/or SP-CSI-RS and/or SSB after beam indication wherein the subset is determined based on the TCI state(s) of the beam indication. In another example, the gNB updates the spatial filter of P-CSI-RS and/or SP-CSI-RS based on the indicated TCI state(s) after the beam indication of the TCI state(s). In 1620, the UE measures a subset of resources based on latest beam indication. In 1622, the UE reports beam metrics to the gNB based on the measured RS(s). In 1611, the gNB receives the beam metrics.

As illustrated in FIG. 15 and FIG. 16, a new beam indication (e.g., a new TCI state or a new spatial relation information) is indicated to a UE, for example through L1 control signaling (i.e., DCI) and/or through L2 signaling (i.e., MAC CE). The UE receives the corresponding beam indication and in response provides HARQ-ACK feedback to the gNB. The gNB and UE can apply the new beam (i.e., TCI state or spatial relation filter) after time $T_1$ after the start or the end of the channel conveying the HARQ-ACK feedback with positive acknowledgement for the beam indication.

In another example, the gNB and UE can apply the new beam (i.e., TCI state or spatial relation filter) after time $T_1$ after the start or the end of the channel conveying the beam indication that is positively acknowledged. At time $T_2$ after the start or the end of the channel conveying the HARQ-ACK feedback with positive acknowledgement for beam indication, the UE can update the set of resources S for beam measurement and reporting. In another example, after time $T_2$ after the start or the end of the channel conveying the beam indication that is positively acknowledged, the UE can update the set of resources S for beam measurement and reporting. In another example, after time $T_2$ after the start or the end of the channel conveying the beam indication, the UE can update the set of resources S for beam measurement and reporting S can include SSB resources and/or CSI-RS resources and/or CSI-RS resource sets.

In one example 2.3.1, $T_2$ is configured and/or updated by higher layer RRC signaling. In another example 2.3.2, $T_2$ is configured and/or updated by MAC CE signaling. In another example 2.3.3, $T_2$ is indicated by the beam indication signaling (DCI or MAC CE), wherein the code points for $T_2$ can be configured and/or updated by RRC signaling or by MAC CE signaling. $T_2$ can be larger than or equal to or smaller than $T_1$. The UE reports beam metrics and corresponding resource indicators based on set S. In one example $T_2$ can depend on a UE capability. In one example, the configured/indicated $T_2$ is greater than or greater than or equal to a minimum time offset determined based on the UE capability. In another example, $T_2$ is provided by the UE capability. In one example, $T_2$ is not provided and the beam measurement RS is received by the UE at the same time the new indicated by the TCI state triggering the beam measurement RS is applied, i.e., based on time $T_1$. In one example, $T_2$ depends on the sub-carrier spacing. In one sub-example, the sub-carrier spacing can be the subcarrier spacing of the channel conveying the beam indication, the channel conveying the acknowledgment of the beam indication, or the beam measurement RS. In another sub-example, the sub-carrier spacing can be the minimum subcarrier spacing of two or more of the aforementioned channels or RSs. In one example, $T_2$ is specified in the system specifications, e.g., $T_2$ can be specified in the system specifications based on subcarrier spacing and/or UE capability. In one example $T_2$ is configured/indicated by the network with a minimum value specified in the system specifications, e.g., the minimum value can be specified in the system specifications based on subcarrier spacing and/or UE capability.

In another example, a measurement report is triggered after time $T_3$ after the start or the end of the channel conveying the beam indication that is positively acknowledged. In another example, a measurement report is triggered after time $T_3$ after the start or the end of the channel conveying the beam indication. In another example a measurement report is triggered after time $T_3$ after the start or the end of the channel conveying the HARQ-ACK feedback with positive acknowledgement for beam indication. In another example, a measurement report is triggered after time $T_3$ after the start or the end of the corresponding CSI-RS or SSB resources being measured. The measurement includes beam measurements (e.g., L1-RSRP and/or L1-RSRQ and/or L1-SINR and CQI) of some or all of the CSI-RS resources and/or resource sets in set S. In one example 2.3.4, $T_3$ is configured and/or updated by higher layer RRC signaling. In another example 2.3.5, $T_3$ is configured and/or updated by MAC CE signaling. In another example 2.3.6, $T_3$ is indicated by the beam indication signaling (DCI or MAC CE), wherein the code points for $T_3$ can be configured and/or updated by RRC signaling or by MAC CE signaling. In one example $T_3$ can depend on a UE capability. In one example, the configured/indicated $T_3$ is greater than or greater than or equal to a minimum time offset determined based on the UE capability. In another example, $T_3$ is provided by the UE capability. In one example, $T_3$ depends on the sub-carrier spacing. In one sub-example, the sub-carrier spacing can be the subcarrier spacing of the channel conveying the beam indication, the channel conveying the acknowledgment of the beam indication, the beam measurement RS or the channel conveying the measurement report. In another sub-example, the sub-carrier spacing can be the minimum subcarrier spacing of two or more of the aforementioned channels or RSs. In one example, $T_3$ is specified in the system specifications, e.g., $T_3$ can be specified in the system specifications based on subcarrier spacing and/or UE capability. In one example $T_3$ is configured/indicated by the network with a minimum value specified in the system specifications, e.g., the minimum value can be specified in the system specifications based on subcarrier spacing and/or UE capability.

In FIG. 16, network provides the UE information about association between the TCI states to be indicated to the UE and measurement RS (step 1602), e.g., as indicated in Table 2, wherein the measurement RS can be semi-persistent CSI-RS or periodic CSI-RS or SSB.

TABLE 2

Association between TCI States and Reference Signals (Reference Signal IDs) used for beam measurement.

| TCI State | Measurement RS (e.g., semi-persistent CSI-RS or periodic CSI-RS or SSB) |
|---|---|
| TCI_State_0 | RS_0_0, RS_0_1, . . . |
| TCI_State_1 | RS_1_0, . . . |
| . . . | . . . |

In one example 2.4.1, the CSI-RS resource can be configured with "repetition off," i.e., a UE may not assume that the CSI-RS resources within a CSI-RS resource set are transmitted with a same downlink spatial domain transmission filter.

In another example 2.4.2, the CSI-RS resource can be configured with "repetition on," i.e., a UE can assume that the CSI-RS resources within a CSI-RS resource set are transmitted with a same downlink spatial domain transmission filter.

In another example 2.4.3, as also discussed in the '582 application, the CSI-RS resource can be configured with "repetition partially on," i.e., a UE can assume that a subset of the CSI-RS resources within a CSI-RS resource set are transmitted with a same downlink spatial domain transmission filter, the UE may not assume that the CSI-RS resources within different subsets of the CSI-RS resource set are transmitted with a same downlink spatial domain transmission filter.

In one example 2.5, the channel conveying the beam indication includes $M_D \geq 1$ DL TCI state IDs, and/or $N_U \geq 1$ UL TCI state IDs and/or $M_j = N_j \geq 1$ joint DL/UL state IDs.

In one example 2.5.1, $M_D + N_U + M_j = 1$, i.e., the channel conveying the beam indications includes one TCI state ID: (1) $M_D = 1$, $N_U = 0$ and $M_j = 0$; (2) $M_D = 0$, $N_U = 1$ and $M_j = 0$; or (3) $M_D = 0$, $N_U = 0$ and $M_j = 1$. Set S corresponds to the indicated DL TCI state ID or UL TCI state ID or Joint TCI state ID. The UE reports beam metrics and corresponding resource indicators based on set S.

In one example 2.5.2, $M_D + N_U + M_j \geq 1$, $K = M_D + N_U + M_j$ TCI state IDs are included in the channel conveying the beam indications. This is illustrated in FIG. 17.

Figure 17:
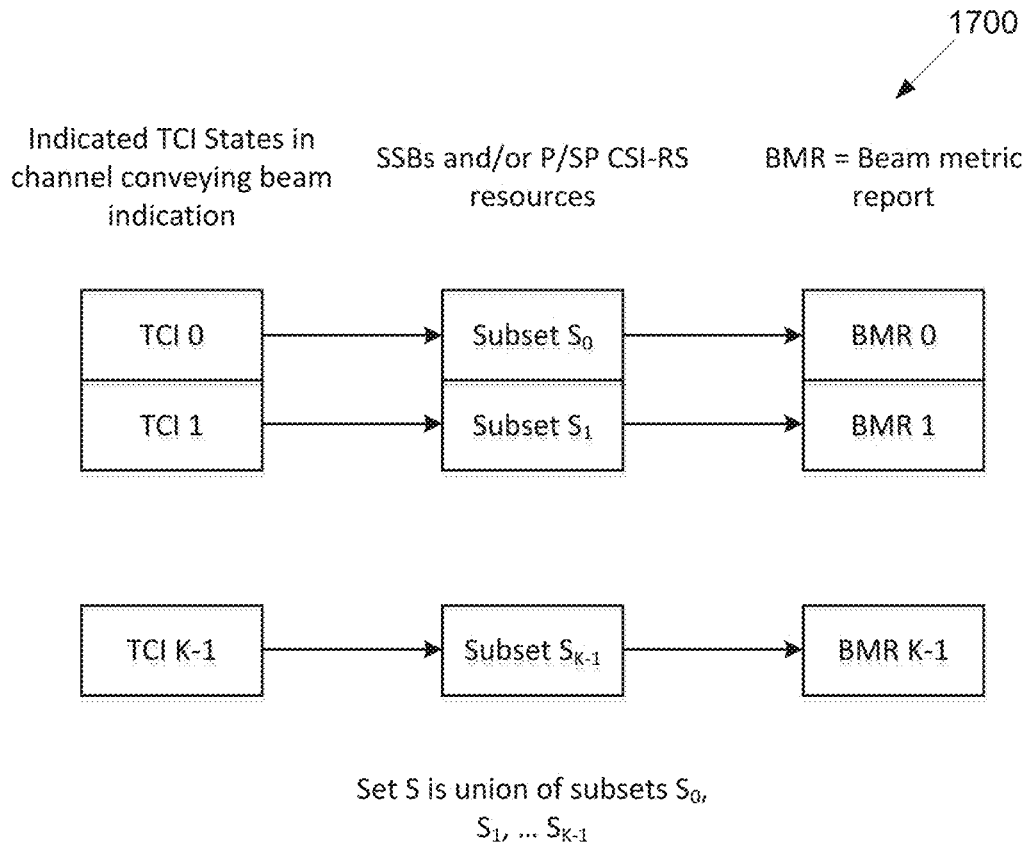
FIG. 17 illustrates an example new beam indication and beam/channel measurement and reporting according to embodiments of the present disclosure.

FIG. 17 illustrates an example new beam indication and beam/channel measurement and reporting 1700 according to embodiments of the present disclosure. An embodiment of the new beam indication and beam/channel measurement and reporting 1700 shown in FIG. 17 is for illustration only.

Set S includes K subsets of SSBs and/or P/SP CSI-RS resources, each subset corresponds to an indicated TCI state ID. The association between a TCI state ID and the SSBs and/or P/SP CSI-RS resources in the subset can be configured/updated by RRC signaling and/or MAC CE signaling. The UE reports K beam metric reports, wherein each beam metric report includes beam metrics and corresponding resource indicators based on a corresponding subset of S. The association between a beam metric report and a subset of S (and/or a TCI state ID) can be configured/updated by RRC signaling and/or MAC CE signaling.

In one example, the K beam metric reports are included in a same reporting instance.

In another example, each beam metric report is included in its own reporting instance, there are K reporting instances for the K beam metric reports.

In another example, the K beam metric reports are included in more than one reporting instance but less than K reporting instances, a reporting instance can include one or more beam metric reports.

In one example 2.5.3, $M_D + N_U + M_j \geq 1$, $K = M_D + N_U + M_j$ TCI state IDs are included in the channel conveying the beam indications.

Set S includes K1 subsets of SSBs and/or P/SP CSI-RS resources, wherein K1≤K. Each indicated TCI state ID corresponds to at most one subset in set S. The association between a TCI state ID and the SSBs and/or P/SP CSI-RS resources in the subset can be configured/updated by RRC signaling and/or MAC CE signaling. The UE reports K1 beam metric reports, wherein each beam metric report includes beam metrics and corresponding resource indicators based on a corresponding subset of S. The association between a beam metric report and a subset of S (and/or a TCI state ID) can be configured/updated by RRC signaling and/or MAC CE signaling.

In one example, the K1 beam metric reports are included in a same reporting instance.

In another example, each beam metric report is included in its own reporting instance, there are K1 reporting instances for the K1 beam metric reports.

In another example, the K1 beam metric reports are included in more than one reporting instance but less than K1 reporting instances, a reporting instance can include one or more beam metric reports.

In one example, an indicated TCI state ID has no corresponding subset in set S, and no corresponding beam metric report.

In another example, a subset in set S can correspond to one or more indicated TCI state IDs.

In another example, the channel conveying the TCI state IDs can indicate the TCI state IDs for which a UE reports a beam metric report.

In one example 2.6, a network can configure through high layer signaling (RRC signaling and/or MAC CE signaling): (1) a first set or sets of DL measurement RS resources (e.g., CSI-RS and/or SSB), and beam measurement reporting resources and beam measurement types; and/or a second set or sets of UL measurement RS resources (e.g., SRS).

A channel conveying a beam indication can indicate whether the UE: (1) measures the DL measurement RS resources and provides the beam measurement report on the configured resources for beam reporting; (2) transmits an UL measurement RS (e.g., SRS); or (3) do both (1) and (2).

The indication type of measurement RS(s) can be based on a new flag in the channel conveying the beam indication, new values for an existing flag in the channel conveying the beam indication, a combination of field values of exiting fields in the channel conveying the beam indication or a specific RNTI or a specific RNTI in the channel conveying the beam indication.

The measurement RS resources and the report resources (if applicable) can be one of the following: (1) explicitly signaled in the channel conveying a beam indication (e.g., a TCI state); or (2) implicitly determined based higher layer configuration of resource sets and mapping of resource sets to TCI states, and the TCI state indicated in the channel conveying a beam indication.

In examples the aforementioned above, the channel conveying the beam indication can trigger a beam measurement report. The measurement RS resources can be implicitly determined without further indication.

In one embodiment, UL beam management/measurement reference signals triggered by beam indication is provided.

As also discussed in the '530 application, a common beam indication can be signaled to the UE, wherein, the common beam indication can apply to DL channels (e.g., PDCCH and PDSCH) and/or to uplink channels (e.g., PUCCH and PUSCH). The common beam indication can be a TCI state, wherein a TCI state is associated with a reference signal (e.g., CSI-RS or SSB or SRS) with a QCL-TypeD establishing an association with a spatial filter. The common beam indication can be spatial relation information.

The network can indicate a new common TCI state (or spatial relation information) through DL control signaling (i.e., DCI) and/or through L2 signaling (e.g., MAC CE).

In one example, the TCI state is associated with a reference signal (e.g., SSB or CSI-RS), wherein the reference signal is a source RS for the TCI state of QCL Type D or a spatial reference signal for the TCI state, associated with a coarse spatial filter. In another example, the TCI state is associated with a reference signal (e.g., SRS), wherein the reference signal is a spatial reference signal for the TCI state, and the source RS of the reference signal is a DL reference signal (e.g., SSB or CSI-RS). A TCI-state and/or a QCL- TypeD reference RS associated with the TCI-State and/or a source reference RS associated with the TCI state can be associated or mapped or linked to a set S, wherein, S is a set of SRS resource(s) and/or a set of SRS resource set(s). In one example, the source RS of the TCI state is the reference RS of the spatial relation information of the SRS resource(s) and/or SRS resource set(s) in set S. The new (most recently updated) TCI state indication triggers the aperiodic (AP)-SRS and/or semi-persistent (SP) SRS, wherein the SRS resources and/or the SRS resource sets associated with the AP-SRS or SP-SRS are those associated or mapped or linked to the new TCI state (i.e., set S).

In one embodiment, the UE assumes that the aforementioned RS (AP-SRS and/or SP-SRS) is (or, for SP, starts to be) transmitted concurrently with the beam indication after a timing offset T_OFFSET. Some example values of T_OFFSET include 0 (no offset) and n>0 OFDM symbol(s). The transmission of the RS can be assumed without an additional triggering from the NW (e.g., via the SRS request field in a channel conveying a beam indication (e.g., a TCI state) such as a purposed designed DCI format for beam indication, and/or UL-related DCI with or without UL grant and/or DL-related DCI with or without DL assignment). That is, the UE assumes that the RS is transmitted T_OFFSET after the reception of the beam indication. In one sub-embodiment, an RS trigger parameter is included in the beam indication together with the TCI state update. The RS trigger parameter can include some information on the RS such as a resource or resource set index/indices associated with the RS. In another sub-embodiment, a parameter indicating the T_OFFSET is included in the beam indication together with the TCI state update. The set of possible values of T_OFFSET can be configured via higher-layer (e.g., RRC) signaling and/or MAC CE signaling. The T_OFFSET signaled together with the TCI state update indicates a value taken from the set. In another sub-embodiment, both the RS trigger parameter and the T_OFFSET parameter are included in the beam indication together with the TCI state update. In another sub-embodiment, the beam indication does not include the RS trigger parameter or the T_OFFSET parameter. In this case, at least one of the RS resource or resource set indices or the T_OFFSET parameter is configured via higher-layer (e.g., RRC) signaling or MAC CE. Therefore, the TCI state update itself functions as the trigger for the RS with a pre-configured resource or resource set information and/or T_OFFSET value, if applicable. In one example T_OFFSET can depend on a UE capability. In one example, the configured/indicated T_OFFSET is greater than or greater than or equal to a minimum time offset determined based on the UE capability. In another example, T_OFFSET is provided by the UE capability.

In another embodiment, the UE assumes that the aforementioned RS (AP-SRS and/or SP-SRS) is (or, for SP, starts to be) transmitted after an additional (subsequent) triggering from the NW (e.g., via the SRS request field in UL-related with or without UL grant and/or DL-related DCI with or without DL assignment) is received analogous to the regular procedure for the reception of aperiodic or semi-persistent RS. That is, after receiving the beam indication, the UE may await the reception of another SRS triggering (e.g., via the SRS request field in UL-related DCI and/or DL-related DCI) before transmitting the associated RS.

In one example 3.1.1, set S can be configured and/or updated through higher layer RRC signaling.

In another example 3.1.2, set S can be configured and/or updated through MAC CE signaling.

In another example 3.1.3, set S can be signaled to a UE dynamically through an SRS request providing set S.

In another example 3.1.4, set S can be singled with the beam indication, i.e., set S is signaled in the DCI of the beam indication and/or the MAC CE of the beam indication and/or a combination of MAC CE and DCI.

In another example 3.1.5, one or more set S can be configured and/or update through higher layer RRC signaling and/or MAC CE signaling. The mapping of one or more set S to one or more TCI states is configured and/or updated through RRC signaling.

The TCI state in the channel conveying the beam indication implicitly determines the set S for SRS transmission.

Figure 18:
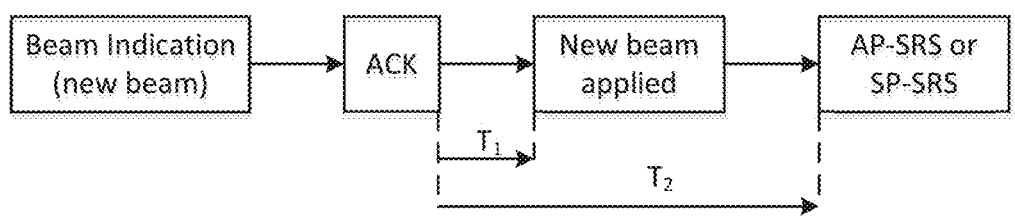
FIG. 18 illustrates an example new beam indication and beam/channel measurement RS transmission according to embodiments of the present disclosure.

FIG. 18 illustrates an example new beam indication and beam/channel measurement RS transmission 1800 according to embodiments of the present disclosure. An embodiment of the new beam indication and beam/channel measurement RS transmission 1800 shown in FIG. 18 is for illustration only.

Figure 19:
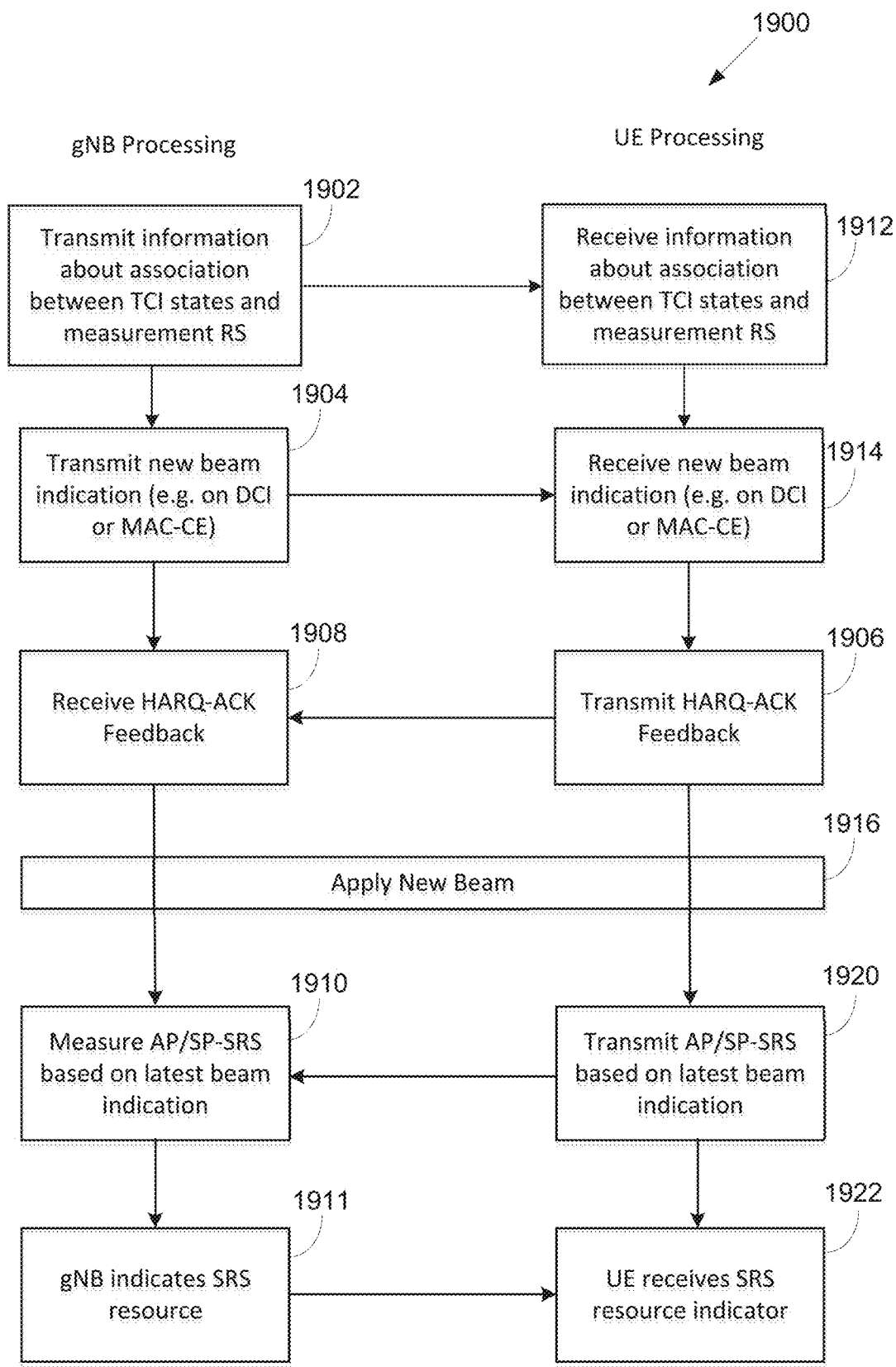
FIG. 19 illustrates an example gNB and UE operation for new beam indication and beam/channel measurement RS transmission according to embodiments of the present disclosure.

FIG. 19 illustrates an example gNB and UE operation 1900 for new beam indication and beam/channel measurement RS transmission according to embodiments of the present disclosure. For example, the gNB and UE operation 1900 as may be performed by a UE such 111-116 and a BS (e.g., gNB) such as 101-103 as illustrated in FIG. 1. An embodiment of the gNB and UE operation 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

As illustrated in FIG. 19, a gNB and a UE perform an operation for a new beam indication and beam/channel measurement RS transmission. In 1902, the gNB transmits information about association between TCI states and measurement RS to the UE. In 1912, the UE receives the information about association between TCI states and measurement RS. In 1904, the gNB transmits a new beam indication to the UE. In 1914, the UE receives the new beam indication, for example, using DCI or MAC-CE. The DCI can be a purpose-designed DCI conveying beam indication, a DL related DCI with or without DL assignment conveying beam indication and/or an UL related DCI with or without UL grant conveying beam indication. MAC CE can be a MAC CE conveying beam indication. Beam indication can include one or more TCI states, and/or one or more TCI state code points, wherein a TCI state code point can indicate one or more TCI states. In 1916, the UE transmits HARQ-ACK feedback to the gNB for beam indication. In 1906, the gNB receives the HARQ-ACK feedback for beam indication. In 1908, the gNB and the UE apply the new beam or beams, e.g., based on the indicated TCI state(s), for further operation between the gNB and the UE. In 1920, the UE transmits AP/SP-SRS based on latest beam indication to the gNB. In 1910, the gNB measures AP/SP-SRS based on latest beam indication. In 1911, the gNB indicates SRS resources/TCI states to the UE based on the measured SRS. In 1922, the UE receives SRS resource indicator/TCI state based on the measured SRS.

As illustrated in FIG. 18 and FIG. 19, a new beam indication (e.g., a new TCI state or a new spatial relation information) is indicated to a UE, for example through L1 control signaling (i.e., DCI) and/or through L2 signaling (i.e., MAC CE). The UE receives the corresponding beam indication and in response provides HARQ-ACK feedback to the gNB. The gNB and UE can apply the new beam (i.e., TCI state or spatial relation filter) after time $T_1$ after the start or the end of the channel conveying the HARQ-ACK feedback with positive acknowledgement for beam indication.

In another example, the gNB and UE can apply the new beam (i.e., TCI state or spatial relation filter) after time $T_1$ after the start or the end of the channel conveying the beam indication that is positively acknowledged. An AP-SRS or SP-SRS for beam management and indication is triggered after time $T_2$ after the start or the end of the channel conveying the HARQ-ACK feedback with positive acknowledgement for the beam indication.

In another example an AP-SRS or SP-SRS for beam management and indication is triggered after time $T_2$ after the start or the end of the channel conveying the beam indication that is positively acknowledged. The AP-SRS or SP-SRS includes SRS resources and/or resource sets in set S.

In one example 3.2.1, $T_2$ is configured and/or updated by higher layer RRC signaling. In another example 3.2.2, $T_2$ is configured and/or updated by MAC CE signaling. In another example 3.2.3, $T_2$ is indicated by the beam indication signaling (DCI or MAC CE), wherein the code points for $T_2$ can be configured and/or updated by RRC signaling or by MAC CE signaling. $T_2$ can be larger than or equal to or smaller than $T_1$. The gNB indicates and UE receives the SRS resource indicator based on set S. In one example $T_2$ can depend on a UE capability. In one example, the configured/indicated $T_2$ is greater than or greater than or equal to a minimum time offset determined based on the UE capability. In another example, $T_2$ is provided by the UE capability. In one example, $T_2$ is not provided and the beam measurement RS is transmitted by the UE at the same time the new indicated by the TCI state triggering the beam measurement RS is applied, i.e., based on time $T_1$. In one example, $T_2$ depends on the sub-carrier spacing. In one sub-example, the sub-carrier spacing can be the subcarrier spacing of the channel conveying the beam indication, the channel conveying the acknowledgment of the beam indication, or the beam measurement RS. In another sub-example, the sub-carrier spacing can be the minimum subcarrier spacing of two or more of the aforementioned channels or RSs. In one example, $T_2$ is specified in the system specifications, e.g., $T_2$ can be specified in the system specifications based on subcarrier spacing and/or UE capability. In one example $T_2$ is configured/indicated by the network with a minimum value specified in the system specifications, e.g., the minimum value can be specified in the system specifications based on subcarrier spacing and/or UE capability.

In FIG. 19, network provides the UE information about association between the TCI states to be indicated to the UE and measurement RS (step 1902), e.g., as indicated in Table 3, wherein the measurement RS can be aperiodic SRS or semi-persistent SRS.

TABLE 3

Association between TCI States and Reference Signals (Reference Signal IDs) used for beam measurement.

| TCI State | Measurement RS (e.g., aperiodic SRS or semi-persistent SRS) |
|---|---|
| TCI_State_0 | RS_0_0, RS_0_1, . . . |
| TCI_State_1 | RS_1_0, . . . |
| . . . | . . . |

In one example 3.3.1, the SRS resource can be configured with "repetition off," i.e., a UE can transmit the SRS resources within an SRS resource set with different uplink spatial domain transmission filters.

In another example 3.3.2, the SRS resource can be configured with "repetition on," i.e., a UE transmits the SRS resources within an SRS resource set with a same uplink spatial domain transmission filter.

In another example 3.3.3, the SRS resource can be configured with "repetition partially on," i.e., a UE transmits SRS resources of a subset of SRS resources within a SRS resource set with a same uplink spatial domain transmission filter, the UE can transmit SRS resources within different subsets of the SRS resource set with different uplink spatial domain transmission filters.

In one example 3.4, the channel conveying the beam indication includes $M_D \geq 1$ DL TCI state IDs, and/or $N_U \geq 1$ UL TCI state IDs and/or $M_j = N_j \geq 1$ joint DL/UL state IDs.

In one example 3.4.1, $M_D + N_U + M_j = 1$, i.e., the channel conveying the beam indications includes one TCI state ID: (1) $M_D = 1$, $N_U = 0$ and $M_j = 0$; (2) $M_D = 0$, $N_U = 1$ and $M_j = 0$; and/or $M_D = 0$, $N_U = 0$ and $M_j = 1$. Set S corresponds to the indicated DL TCI state ID or UL TCI state ID or Joint TCI state ID. The UE transmits set S of AP-SRS or SP-SRS based on the indicated TCI state ID.

In one example 3.4.2, $M_D + N_U + M_j \geq 1$, $K = M_D + N_U + M_j$ TCI state IDs are included in the channel conveying the beam indications. This is illustrated in FIG. 20.

Figure 20:
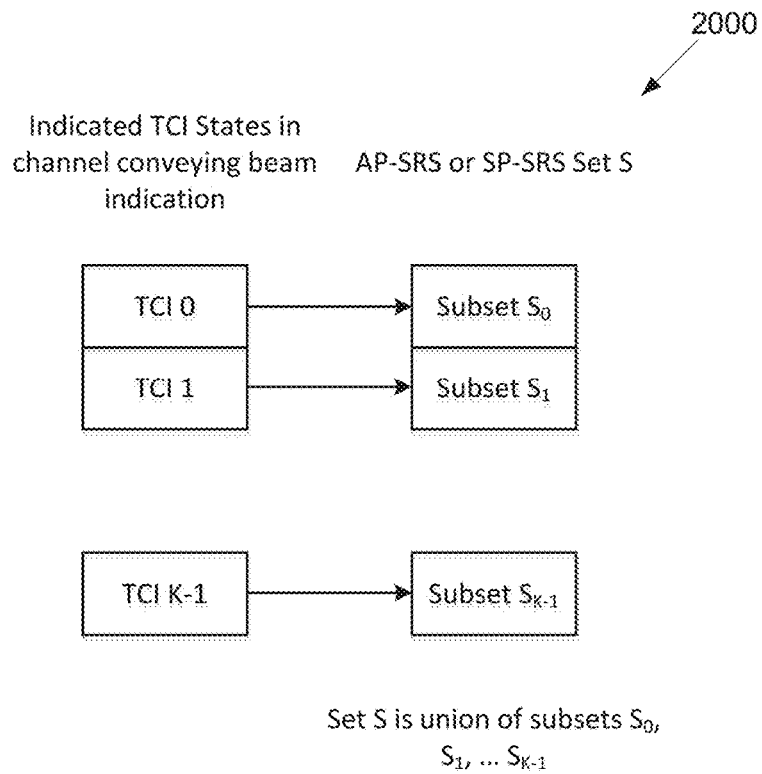
FIG. 20 illustrates an example beam indication and beam/channel measurement RS transmission according to embodiments of the present disclosure.

FIG. 20 illustrates an example beam indication and beam/channel measurement RS transmission 2000 according to embodiments of the present disclosure. An embodiment of the beam indication 2000 shown in FIG. 20 is for illustration only.

Set S includes K subsets of AP-SRS or SP-SRS resources, each subset corresponds to an indicated TCI state ID. The association between a TCI state ID and the AP-SRS or SP-SRS resources in the subset can be configured/updated by RRC signaling and/or MAC CE signaling.

In one example 3.4.3, $M_D + N_U + M_j \geq 1$, $K = M_D + N_U + M_j$ TCI state IDs are included in the channel conveying the beam indications.

Set S includes K1 subsets of AP-SRS or SP-SRS resources, wherein K1≤K. Each indicated TCI state ID corresponds to at most one subset in set S. The association between a TCI state ID and the AP-SRS or SP-SRS resources in the subset can be configured/updated by RRC signaling and/or MAC CE signaling.

In one example, an indicated TCI state ID has no corresponding subset in set S, and no corresponding SRS transmission.

In another example, a subset in set S can correspond to one or more indicated TCI state IDs.

In another example, the channel conveying the TCI state IDs can indicate the TCI state IDs for which a UE transmits a subset of SRS resources.

In one example 3.5, a network can configure through high layer signaling (RRC signaling and/or MAC CE signaling): (1) a first set or sets of DL measurement RS resources (e.g., CSI-RS and/or SSB), and beam measurement reporting resources and beam measurement types; and/or (2) a second set or sets of UL measurement RS resources (e.g., SRS).

A channel conveying a beam indication can indicate whether the UE: (1) measures the DL measurement RS resources and provides the beam measurement report on the configured resources for beam reporting; (2) transmits an UL measurement RS (e.g., SRS); or (3) do both (1) and (2).

The indication type of measurement RS(s) can be based on a new flag in the channel conveying the beam indication, new values for an existing flag in the channel conveying the beam indication, a combination of field values of exiting fields in the channel conveying the beam indication or a specific RNTI or a specific RNTI in the channel conveying the beam indication.

The measurement RS resources and the report resources (if applicable), can be one of the following: (1) explicitly signaled in the channel conveying a beam indication (e.g., a TCI state); and/or (2) implicitly determined based higher layer configuration of resource sets and mapping of resource sets to TCI states, and the TCI state indicated in the channel conveying a beam indication.

In one embodiment, UL beam management/measurement reference signals updated by beam indication is provided.

As also discussed in the '530 application, a common beam indication can be signaled to the UE, wherein, the common beam indication can apply to DL channels (e.g., PDCCH and PDSCH) and/or to uplink channels (e.g., PUCCH and PUSCH). The common beam indication can be a TCI state, wherein a TCI state is associated with a reference signal (e.g., CSI-RS or SSB or SRS) with a QCL-TypeD establishing an association with a spatial filter. The common beam indication can be spatial relation information.

The network can indicate a new common TCI state (or spatial relation information) through DL control signaling (i.e., DCI) and/or through L2 signaling (e.g., MAC CE). In one example, the UE is configured with UL reference signals R for beam measurement and indication. In one example 4.1.1, R can correspond to SRS resources or SRS resource sets, wherein in one example 4.1.1.1 the SRS resources are periodic SRS resources, in another example 4.1.1.2, the SRS resources are semi-persistent SRS resources. In another example 4.1.2, R can contain SRS according to examples 4.1.1.1 and 4.1.1.2.

A TCI-state and/or a QCL-TypeD reference RS associated with the TCI-State can be associated or mapped or linked to a set S, wherein, S is a set of SRS resource(s) and/or a set of SRS resource set(s).

In one example 4.2.1, set S can be a subset of R. A new TCI state indication updates the periodic or semi-persistent resources (i.e., SRS resources) for uplink beam measurement and beam reporting, wherein the resources for beam measurement are those of set S linked or mapped to the new TCI state. In one example, the source RS of the TCI state is the reference RS of the spatial relation information of the SRS resource(s) and/or SRS resource set(s) in set S.

In another example 4.2.2, set S can be set R, wherein a new TCI state indication with source reference signal RSn updates the reference RS of the spatial relation information of the SRS resource(s) and/or SRS resource set(s) in set S to RSn.

In one example 4.3.1, set S and/or set R can be configured and/or updated through higher layer RRC signaling. The mapping of one or more set S to one or more TCI states is configured and/or updated through RRC signaling.

The TCI state in the channel conveying the beam indication implicitly determines the set S for SRS transmission.

In another example 4.3.2, set S and/or set R can be configured and/or updated through MAC CE signaling. The mapping of one or more set S to one or more TCI states is configured and/or updated through MAC CE signaling.

The TCI state in the channel conveying the beam indication implicitly determines the set S for SRS transmission.

In another example 4.3.3, set S can be signaled to a UE dynamically through an SRS request providing set S.

In another example 4.3.4, set S can be singled with the beam indication, i.e., set S is signaled in the DCI of the beam indication and/or the MAC CE of the beam indication and/or a combination of MAC CE and DCI.

In one example 4.3.4.1, RRC signaling and/or MAC CE signaling configures one or more set S, the DCI of the beam indication (i.e., the channel conveying the beam indication) conveys a set index for SRS transmission.

Figure 21:
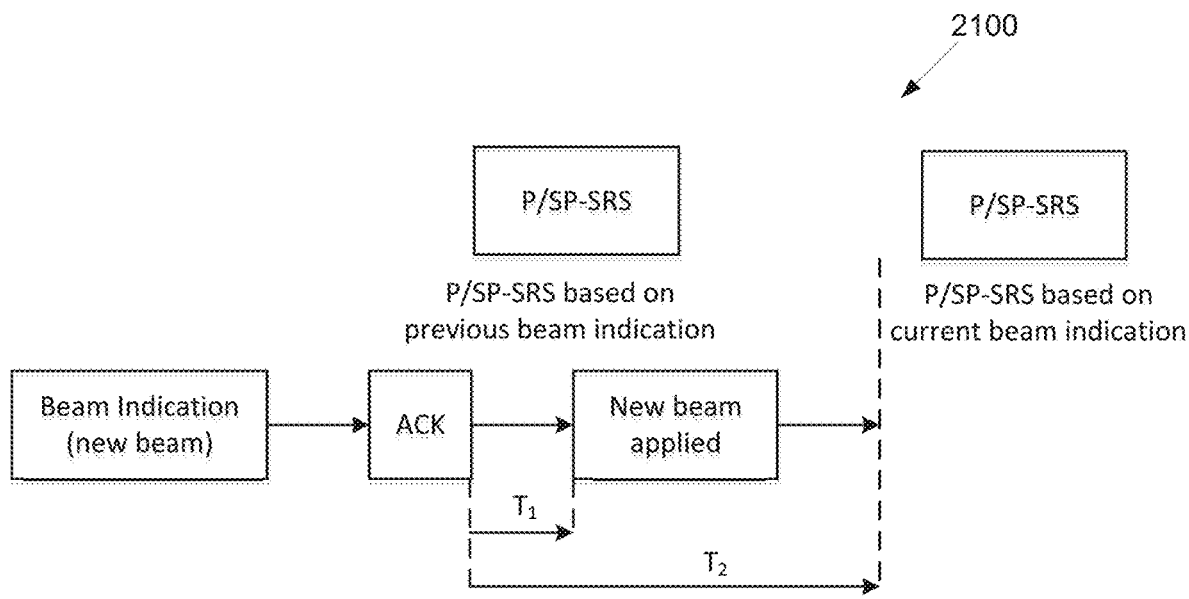
FIG. 21 illustrates an example new beam indication and beam/channel measurement RS transmission according to embodiments of the present disclosure.

FIG. 21 illustrates an example new beam indication and beam/channel measurement RS transmission 2100 according to embodiments of the present disclosure. An embodiment of the beam indication and beam/channel measurement RS transmission 2100 shown in FIG. 21 is for illustration only.

Figure 22:
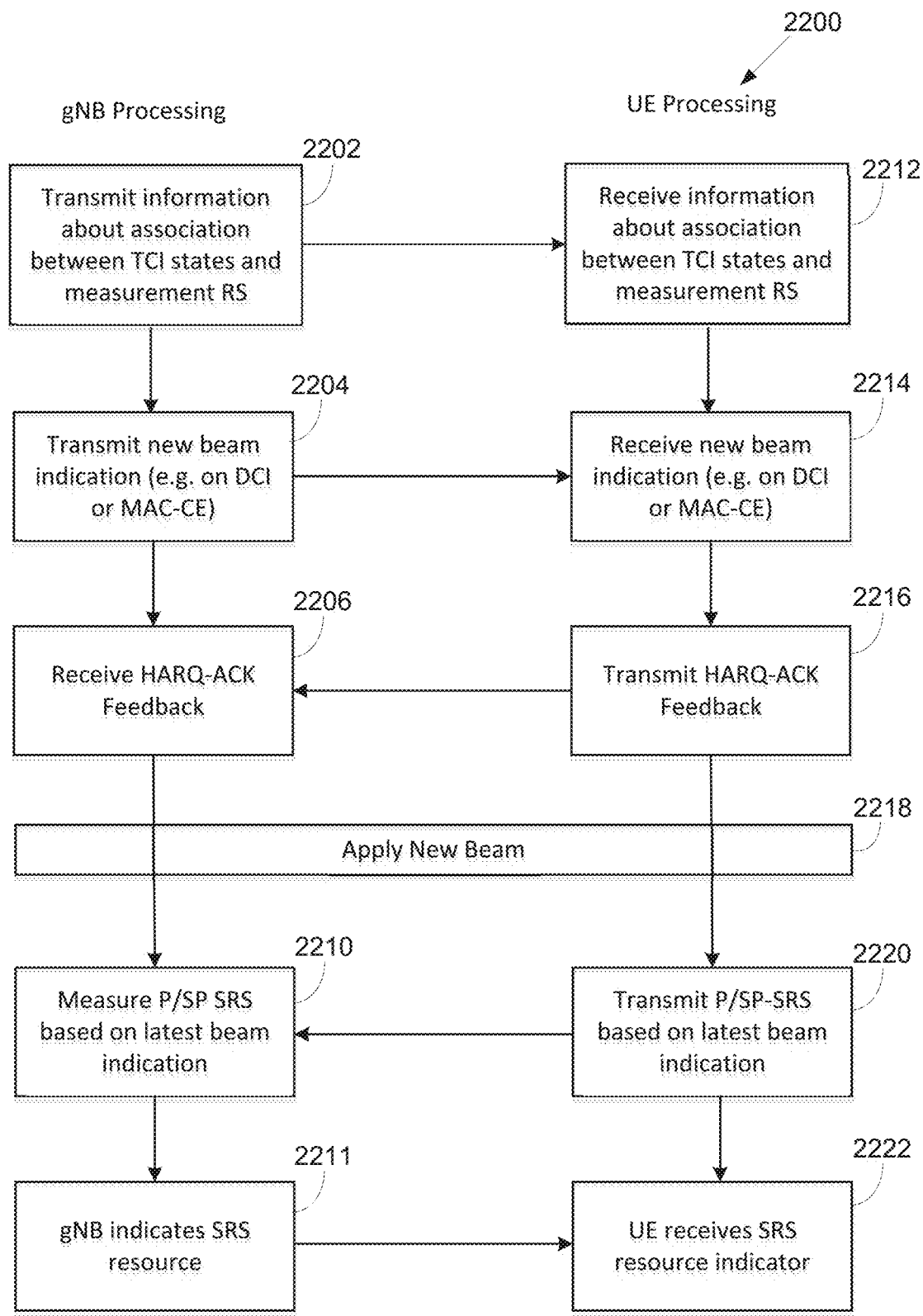
FIG. 22 illustrates an example gNB and UE operation for new beam indication and beam/channel measurement RS transmission according to embodiments of the present disclosure.

FIG. 22 illustrates an example gNB and UE operation 2200 for new beam indication and beam/channel measurement RS transmission according to embodiments of the present disclosure. For example, the gNB and UE operation 2200 as may be performed by a UE such 111-116 and a BS such as 101-103 as illustrated in FIG. 1. An embodiment of the gNB and UE operation 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

As illustrated in FIG. 22, a gNB and a UE perform an operation for a new beam indication and beam/channel measurement RS transmission. In 2202, the gNB transmits information about association between TCI states and measurement RS to the UE. In 2212, the UE receives the information about association between TCI states and measurement RS. In 2204, the gNB transmits a new beam indication to the UE. In 2214, the UE receives the new beam indication, for example, using DCI or MAC-CE. The DCI can be a purpose-designed DCI conveying beam indication, a DL related DCI with or without DL assignment conveying beam indication and/or an UL related DCI with or without UL grant conveying beam indication. MAC CE can be a MAC CE conveying beam indication. Beam indication can include one or more TCI states, and/or one or more TCI state code points, wherein a TCI state code point can indicate one or more TCI states. In 2216, the UE transmits HARQ-ACK feedback to the gNB for beam indication. In 2206, the gNB receives the HARQ-ACK feedback for beam indication. In 2208, the gNB and the UE apply the new beam or beams, e.g., based on the indicated TCI state(s), for further operation between the gNB and the UE. In 2220, the UE transmits P/SP-SRS based on latest beam indication to the gNB. In 2210, the gNB measures AP/SP-SRS based on latest beam indication. In 2211, the gNB indicates SRS resource/TCI state to the UE based on the measured SRS. In 2222, the UE receives SRS resource indicator/TCI state based on the measured SRS.

As illustrated in FIG. 21 and FIG. 22, a new beam indication (e.g., a new TCI state or a new spatial relation information) is indicated to a UE, for example through L1 control signaling (i.e., DCI) and/or through L2 signaling (i.e., MAC CE). The UE receives the corresponding beam indication and in response provides HARQ-ACK feedback to the gNB. The gNB and UE can apply the new beam (i.e., TCI state or spatial relation filter) after time $T_1$ after the start or the end of the channel conveying the HARQ-ACK feedback with positive acknowledgement for the beam indication. In another example, the gNB and UE can apply the new beam (i.e., TCI state or spatial relation filter) after time $T_1$ after the start or the end of the channel conveying the beam indication that is positively acknowledged. At time $T_2$ after the start or the end of the channel conveying the HARQ-ACK feedback with positive acknowledgement for the beam indication, the UE can update the set of resources S for SRS beam management and indication.

In another example, after time $T_2$ after the start or the end of the channel conveying the beam indication that is positively acknowledged, the UE can update the set of resources S for SRS beam management and indication. S can include SRS resources and/or SRS resource sets.

In one example 4.4.1, $T_2$ is configured and/or updated by higher layer RRC signaling. In another example 4.4.2, $T_2$ is configured and/or updated by MAC CE signaling. In another example 4.4.3, $T_2$ is indicated by the beam indication signaling (DCI or MAC CE), wherein the code points for $T_2$ can be configured and/or updated by RRC signaling or by MAC CE signaling. $T_2$ can be larger than or equal to or smaller than $T_1$. The gNB indicates and UE receives the SRS resource indicator based on set S. In one example $T_2$ can depend on a UE capability. In one example, the configured/indicated $T_2$ is greater than or greater than or equal to a minimum time offset determined based on the UE capability. In another example, $T_2$ is provided by the UE capability. In one example, $T_2$ is not provided and the beam measurement RS is transmitted by the UE at the same time the new indicated by the TCI state triggering the beam measurement RS is applied, i.e., based on time $T_1$. In one example, $T_2$ depends on the sub-carrier spacing. In one sub-example, the sub-carrier spacing can be the subcarrier spacing of the channel conveying the beam indication, the channel conveying the acknowledgment of the beam indication, or the beam measurement RS. In another sub-example, the sub-carrier spacing can be the minimum subcarrier spacing of two or more of the aforementioned channels or RSs. In one example, $T_2$ is specified in the system specifications, e.g., $T_2$ can be specified in the system specifications based on subcarrier spacing and/or UE capability. In one example $T_2$ is configured/indicated by the network with a minimum value specified in the system specifications, e.g., the minimum value can be specified in the system specifications based on subcarrier spacing and/or UE capability.

In FIG. 22, network provides the UE information about association between the TCI states to be indicated to the UE and measurement RS (step 2202), e.g., as indicated in Table 2, wherein the measurement RS can be semi-persistent SRS or periodic SRS.

TABLE 4

Association between TCI States and Reference Signals
(Reference Signal IDs) used for beam measurement

| TCI State | Measurement RS (e.g., semi-persistent SRS or periodic SRS or SSB) |
|---|---|
| TCI_State_0 | RS_0_0, RS_0_1, . . . |
| TCI_State_1 | RS_1_0, . . . |
| . . . | . . . |

In one example 4.5.1, the SRS resource can be configured with "repetition off," i.e., a UE can transmit the SRS resources within an SRS resource set with different uplink spatial domain transmission filters.

In another example 4.5.2, the SRS resource can be configured with "repetition on," i.e., a UE transmits the SRS resources within an SRS resource set with a same uplink spatial domain transmission filter.

In another example 4.5.3, the SRS resource can be configured with "repetition partially on," i.e., a UE transmits SRS resources of a subset of SRS resources within a SRS resource set with a same uplink spatial domain transmission filter, the UE can transmit SRS resources within different subsets of the SRS resource set with different uplink spatial domain transmission filters.

In one example 4.6, the channel conveying the beam indication includes $M_D \geq 1$ DL TCI state IDs, and/or $N_U \geq 1$ UL TCI state IDs and/or $M_j = N_j \geq 1$ joint DL/UL state IDs.

In one example 4.6.1, $M_D + N_U + M_j = 1$, i.e., the channel conveying the beam indications includes one TCI state ID: (1) $M_D = 1$, $N_U = 0$ and $M_j = 0$; (2) $M_D = 0$, $N_U = 1$ and $M_j = 0$; and/or (3) $M_D = 0$, $N_U = 0$ and $M_j = 1$. Set S corresponds to the indicated DL TCI state ID or UL TCI state ID or Joint TCI state ID. The UE transmits set S of P/SP-SRS based on the indicated TCI state ID.

In one example 4.6.2, $M_D + N_U + M_j \geq 1$, $K = M_D + N_U + M_j$ TCI state IDs are included in the channel conveying the beam indications. This is illustrated in FIG. 23.

Figure 23:
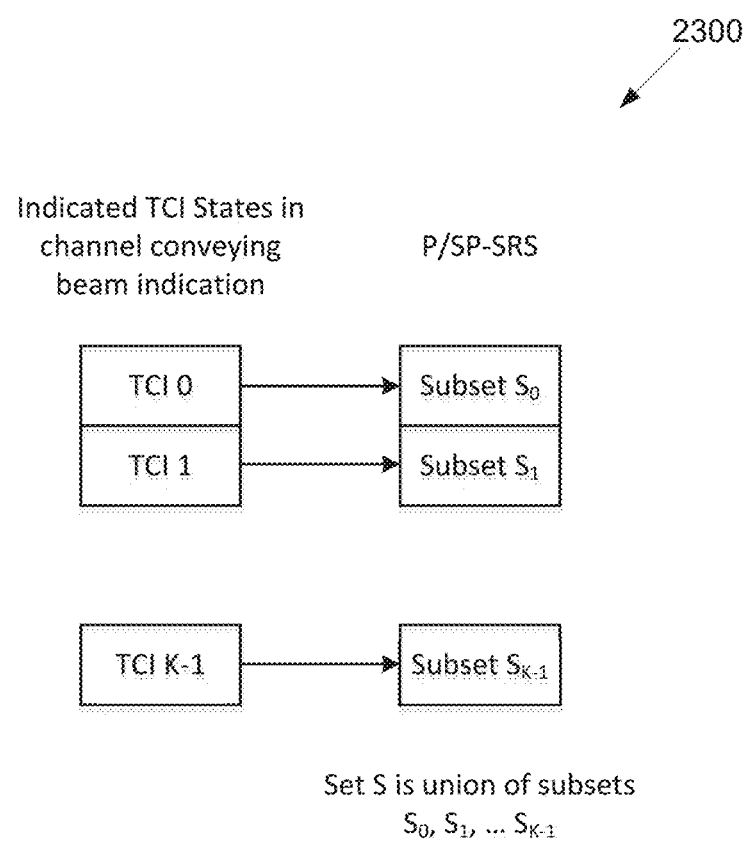
FIG. 23 illustrates an example beam indication and beam/channel measurement RS transmission according to embodiments of the present disclosure.

FIG. 23 illustrates an example beam indication and beam/channel measurement RS transmission 2300 according to embodiments of the present disclosure. An embodiment of the beam indication 2300 shown in FIG. 23 is for illustration only.

Set S includes K subsets of P/SP-SRS resources, each subset corresponds to an indicated TCI state ID. The association between a TCI state ID and the P/SP-SRS resources in the subset can be configured/updated by RRC signaling and/or MAC CE signaling.

In one example 4.6.3, $M_D + N_U + M_j \geq 1$, $K = M_D + N_U + M_j$ TCI state IDs are included in the channel conveying the beam indications.

Set S includes K1 subsets of P/SP-SRS resources, wherein K1 ≤ K. Each indicated TCI state ID corresponds to at most one subset in set S. The association between a TCI state ID and the P/SP-SRS resources in the subset can be configured/updated by RRC signaling and/or MAC CE signaling.

In one example, an indicated TCI state ID has no corresponding subset in set S, and no corresponding SRS transmission.

In another example, a subset in set S can correspond to one or more indicated TCI state IDs.

In another example, the channel conveying the TCI state IDs can indicate the TCI state IDs for which a UE transmits a subset of SRS resources.

In one example 4.7, a network can configure through high layer signaling (RRC signaling and/or MAC CE signaling): (1) a first set or sets of DL measurement RS resources (e.g., CSI-RS and/or SSB), and beam measurement reporting resources and beam measurement types; and/or (2) a second set or sets of UL measurement RS resources (e.g., SRS).

A channel conveying a beam indication can indicate whether the UE: (1) measures the DL measurement RS resources and provides the beam measurement report on the configured resources for beam reporting; (2) transmits an UL measurement RS (e.g., SRS); and/or (3) do both (1) and (2).

The indication type of measurement RS(s) can be based on a new flag in the channel conveying the beam indication, new values for an existing flag in the channel conveying the beam indication, a combination of field values of exiting fields in the channel conveying the beam indication or a specific RNTI or a specific RNTI in the channel conveying the beam indication.

The measurement RS resources and the report resources (if applicable), can be one of the following: (1) explicitly signaled in the channel conveying a beam indication (e.g., a TCI state); or (2) implicitly determined based higher layer configuration of resource sets and mapping of resource sets to TCI states, and the TCI state indicated in the channel conveying a beam indication.

In one embodiment, reference signal usage for beam refinement and beam tracking is provided.

A CSI-RS resource for beam refinement, can be configured with "usage," in the corresponding CSI-RS resource set configuration and/or the CSI-RS resource configuration, set to: (1) in one example 5.1.1, "usage" is set to "TxFilterRefinement" for the refinement of downlink spatial domain transmission filter; (2) in another example 5.1.2, "usage" is set to "RxFilterRefinement" for the refinement of downlink spatial domain reception filter. In this case, the UE can assume that the respective CSI-RS resource(s) share the same TCI state as that most recently updated/signaled for an assigned DL data reception on PDSCH and its associated dedicated control (such as the DL assignment on PDCCH). In this case, repetition is configured and can be set to "ON" or "OFF"; (3) in another example 5.1.3, "usage" is set to "TxRxFilterRefinement" or "FilterRefinement" for the refinement of downlink spatial domain transmission filter and/or downlink spatial domain reception filter; and/or (4) in another example 5.1.4, "usage" is set to "beamManagement" for the refinement of downlink spatial domain transmission filter and/or downlink spatial domain reception filter.

A CSI-RS resource for beam tracking, can be configured with "usage," in the corresponding CSI-RS resource set configuration and/or the CSI-RS resource configuration, set to: (1) in one example 5.2.1, "usage" is set to "TxBeamTracking" for downlink spatial domain transmission filter beam tracking; (2) in another example 5.2.2, "usage" is set to "RxBeamTracking" for downlink spatial domain reception filter beam tracking; (3) in another example 5.2.3, "usage" is set to "TxRxBeamTracking" for "BeamTracking" for downlink spatial domain transmission filter and/or downlink spatial domain reception filter beam tracking; and/or (4) in another example 5.2.4, "usage" is set to "beamManagement" for downlink spatial domain transmission filter and/or downlink spatial domain reception filter beam tracking.

An SRS resource for beam refinement, can be configured with "usage," in the corresponding SRS resource set configuration and/or the SRS resource configuration, set to: (1) in one example 5.3.1, "usage" is set to "TxFilterRefinement" for the refinement of uplink spatial domain transmission filter; (2) in another example 5.3.2, "usage" is set to "RxFilterRefinement" for the refinement of uplink spatial domain reception filter. In this case, the UE can assume that the respective SRS resource(s) share the same TCI state as that most recently updated/signaled for an assigned UL data reception on PUSCH and PUCCH. In this case, repetition is configured and can be set to "ON" or "OFF." Optionally, the UE can assume that the UL (TX) spatial filter SRS intended for Rx beam refinement can be inferred from the TCI state for DL (from the beam indication)—in case of common DL and UL TCI state. In this case, repetition is configured and can be set to "ON" or "OFF"; (3) in another example 5.3.3, "usage" is set to "TxRxFilterRefinement" or "FilterRefinement" for the refinement of uplink spatial domain transmission filter and/or uplink spatial domain reception filter; and/or (4) in another example 5.3.4, "usage" is set to "beamManagement" for the refinement of uplink spatial domain transmission filter and/or uplink spatial domain reception filter.

An SRS resource for beam tracking, can be configured with "usage," in the corresponding SRS resource set configuration and/or the SRS resource configuration, set to: (1) in one example 5.4.1, "usage" is set to "TxBeamTracking" for uplink spatial domain transmission filter beam tracking; (2) in another example 5.4.2, "usage" is set to "RxBeamTracking" for uplink spatial domain reception filter beam tracking. In this case, the UE can assume that the respective SRS resource(s) share the same TCI state as that most recently updated/signaled for an assigned UL data reception on PUSCH and PUCCH. In this case, repetition is configured and can be set to "ON" or "OFF." Optionally, the UE can assume that the UL (TX) spatial filter SRS intended for Rx beam tracking can be inferred from the TCI state for DL (from the beam indication)—in case of common DL and UL TCI state. In this case, repetition is configured and can be set to "ON" or "OFF"; (3) in another example 5.4.3, "usage" is set to "TxRxBeamTracking" for "BeamTracking" for uplink spatial domain transmission filter and/or uplink spatial domain reception filter beam tracking; and/or (4) in another example 5.4.4, "usage" is set to "beamManagement" for uplink spatial domain transmission filter and/or uplink spatial domain reception filter beam tracking.

In any of the above example embodiments, terms such as "RxFilterRefinement," "TxFilterRefinement," "TxBeamTracking," and "RxBeamTracking," etc. are used for illustrative purposes. Those terms can be substituted with any other terms for the same functionality.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:
1. A user equipment (UE), comprising:
a transceiver configured to:
receive information indicating associations between a set of transmission configuration indication (TCI) states and reference signals (RS s) for beam measurement, respectively, and
receive a TCI state from the set of TCI states for beam indication; and
a processor operably coupled to the transceiver, the processor configured to determine, in response to reception of the TCI state, a RS based on the TCI state and the information, wherein the transceiver is further configured to transmit or receive the RS for beam measurement after a timing offset from a time of acknowledgement of the beam indication, and wherein, when the RS is a downlink (DL) RS:
the processor is further configured to measure the RS and determine a measurement report; and
the transceiver is further configured to transmit the measurement report.

2. The UE of claim 1, wherein:
the UE is configured a timing offset,
the RS, associated with the TCI state, is one of an aperiodic channel state information RS (CSI-RS) and a semi-persistent (SP) CSI-RS, and
the transceiver is further configured to receive the aperiodic CSI-RS or the SP CSI-RS after the timing offset from the time of an acknowledgement of the beam indication.

3. The UE of claim 2, wherein the timing offset is based on UE capability.

4. The UE of claim 1, wherein:
the UE is configured a timing offset,
the RS, associated with the TCI state, is a periodic channel state information RS (CSI-RS) or a synchronization signal block (SSB), and
the transceiver is further configured to start to receive the periodic CSI-RS or the SSB after the timing offset from a time of an acknowledgement of the beam indication.

5. The UE of claim 1, wherein:
the UE is configured a timing offset, and
the transceiver is configured to transmit the measurement report after the timing offset, wherein one of:
the timing offset is measured from a time of an acknowledgment of the beam indication, and
the timing offset is measured from a time of the reception of the RS for beam measurement.

6. The UE of claim 1, wherein the measurement report includes a metric that is one of:
a layer 1-reference signal receive power (L1-RSRP),
a layer 1-reference signal receive quality (L1-RSRQ),
a layer 1-signal to interference plus noise ratio (L1-SINR), and
a channel quality indicator (CQI).

7. The UE of claim 1, wherein:
the UE is configured a timing offset,
the RS, associated with the TCI state, is a sounding reference signal (SRS), and
the transceiver is further configured to transmit the SRS after the timing offset from a time of an acknowledgement of the beam indication.

8. A base station (BS), comprising:
a transceiver configured to:
transmit information indicating associations between a set of transmission configuration information (TCI) states and reference signals (RS s) for beam measurement, respectively, and
transmit a TCI state from the set of TCI states for beam indication, and
a processor operably coupled to the transceiver, the processor configured to determine a RS for beam measurement based on the TCI state and the information,
wherein the transceiver is further configured to:
receive or transmit the RS for beam measurement after a timing offset from a time of an acknowledgement of the beam indication, and
when the RS is a downlink (DL) RS, receive a measurement report indicating measurement of the RS.

9. The BS of claim 8, wherein:
the BS configures a timing offset,
the RS, associated with the TCI state, is one of an aperiodic channel state information RS (CSI-RS) and a semi-persistent (SP) CSI-RS, and
the transceiver is further configured to transmit the aperiodic CSI-RS or the SP CSI-RS after the timing offset from the time of an acknowledgement of the beam indication.

10. The BS of claim 9, wherein the timing offset is based on UE capability.

11. The BS of claim 8, wherein:
the BS configures a timing offset,
the RS, associated with the TCI state, is a periodic channel state information RS (CSI-RS) or a synchronization signal block (SSB), and
the transceiver is further configured to transmit the periodic CSI-RS or the SSB after the timing offset from a time of an acknowledgement of the beam indication.

12. The BS of claim 8, wherein:
the BS configures a timing offset, and
the transceiver is further configured to receive the measurement report after the timing offset, wherein one of:
the timing offset is measured from a time of an acknowledgment of the beam indication, and
the timing offset is measured from a time of the transmission of the RS for beam measurement.

13. The BS of claim 8, wherein the measurement report includes a metric that is one of:
a layer 1-reference signal receive power (L1-RSRP),
a layer 1-reference signal receive quality (L1-RSRQ),
a layer 1-signal to interference plus noise ratio (L1-SINR), and
a channel quality indicator (CQI).

14. The BS of claim 8, wherein:
the BS configures a timing offset,
the RS, associated with the indicated TCI, is a sounding reference signal (SRS), and
the transceiver is further configured to receive the SRS after the timing offset from a time of an acknowledgement of the beam indication.

15. A method of operating a user equipment (UE), the method comprising:
receiving information indicating associations between a set of transmission configuration indication (TCI) states and reference signals (RS s) for beam measurement, respectively;
receiving a TCI state from the set of TCI states for beam indication;
determining, in response to reception of the TCI state, a RS for beam measurement based on the TCI state and the information;
transmitting or receiving the RS for beam measurement after a timing offset from a time of an acknowledgement of the beam indication; and
based on the RS being a downlink (DL) RS:
measuring the DL RS and determining a measurement report; and
transmitting the measurement report.

16. The method of claim 15, wherein:
the UE is configured a timing offset,
the RS, associated with the TCI state, is one of an aperiodic channel state information RS (CSI-RS) and a semi-persistent (SP) CSI-RS, and
receiving the RS comprises receiving the aperiodic CSI-RS or the SP CSI-RS after the timing offset from the time of an acknowledgement of the beam indication.

17. The method of claim 15, wherein the timing offset is based on UE capability.

18. The method of claim 15, wherein:
the UE is configured a timing offset,
the RS, associated with the TCI state, is a periodic channel state information RS (CSI-RS) or a synchronization signal block (SSB), and
receiving the RS comprises starting to receive the periodic CSI-RS or the SSB after the timing offset from a time of an acknowledgement of the beam indication.

19. The method of claim 15, wherein:
the UE is configured a timing offset, and
transmitting the measurement report comprises transmitting the measurement report after the timing offset, wherein one of:
the timing offset is measured from a time of an acknowledgment of the beam indication, and
the timing offset is measured from a time of the RS associated with the TCI state.

20. The method of claim 15, wherein:
the UE is configured a timing offset,
the RS, associated with the indicated TCI is a sounding reference signal (SRS), and
transmitting the RS comprises transmitting the SRS after the timing offset from a time of an acknowledgement of the beam indication.

\* \* \* \* \*